US009325893B2

(12) United States Patent
Sakamoto et al.

(10) Patent No.: US 9,325,893 B2
(45) Date of Patent: Apr. 26, 2016

(54) IMAGING INSTRUCTION TERMINAL, IMAGING SYSTEM, IMAGING INSTRUCTION METHOD, AND PROGRAM DEVICE

(71) Applicant: Olympus Corporation, Shibuya-ku, Tokyo (JP)

(72) Inventors: Joji Sakamoto, Joensuu (FI); Kensuke Ishii, Tokyo (JP); Hitoshi Echigo, Sagamihara (JP); Saori Matsumoto, Tokyo (JP); Yoshitaka Sato, Yokohama (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/208,064

(22) Filed: Mar. 13, 2014

(65) Prior Publication Data

US 2014/0313356 A1 Oct. 23, 2014

(30) Foreign Application Priority Data

Mar. 15, 2013 (JP) ................................. 2013-054344

(51) Int. Cl.
*H04N 5/232* (2006.01)

(52) U.S. Cl.
CPC ....... *H04N 5/23203* (2013.01); *H04N 5/23216* (2013.01); *H04N 5/23222* (2013.01); *H04N 5/23241* (2013.01); *H04N 5/23248* (2013.01); *H04N 5/23258* (2013.01); *H04N 5/23293* (2013.01)

(58) Field of Classification Search
CPC .......... H04N 5/23203; H04N 5/23293; H04N 5/23216; H04N 5/2257; H04N 5/232; H04N 5/23251
See application file for complete search history.

(56) References Cited

U.S. PATENT DOCUMENTS

| 6,173,121 | B1 * | 1/2001 | Tomita | G03B 5/00 |
| | | | | 396/52 |
| 6,313,875 | B1 * | 11/2001 | Suga | H04N 7/147 |
| | | | | 348/14.08 |
| 6,919,927 | B1 * | 7/2005 | Hyodo | H04N 1/00411 |
| | | | | 348/333.02 |

FOREIGN PATENT DOCUMENTS

JP        A-11-174576        7/1999

* cited by examiner

*Primary Examiner* — Ahmed A Berhan
(74) *Attorney, Agent, or Firm* — John C. Pokotylo; Straub & Pokotylo

(57) ABSTRACT

An imaging instruction terminal includes: a communication module configured to communicate with an imaging device; a motion detection section configured to detect motion information about motion of the imaging instruction terminal; a command generation section configured to generate an instruction command related to imaging for the imaging device at a timing at which the motion information detected by the motion detection section has exceeded a predetermined threshold value; and a communication control section configured to cause the instruction command related to the imaging to be transmitted from the communication module to the imaging device when the command generation section has generated the instruction command related to the imaging.

21 Claims, 25 Drawing Sheets

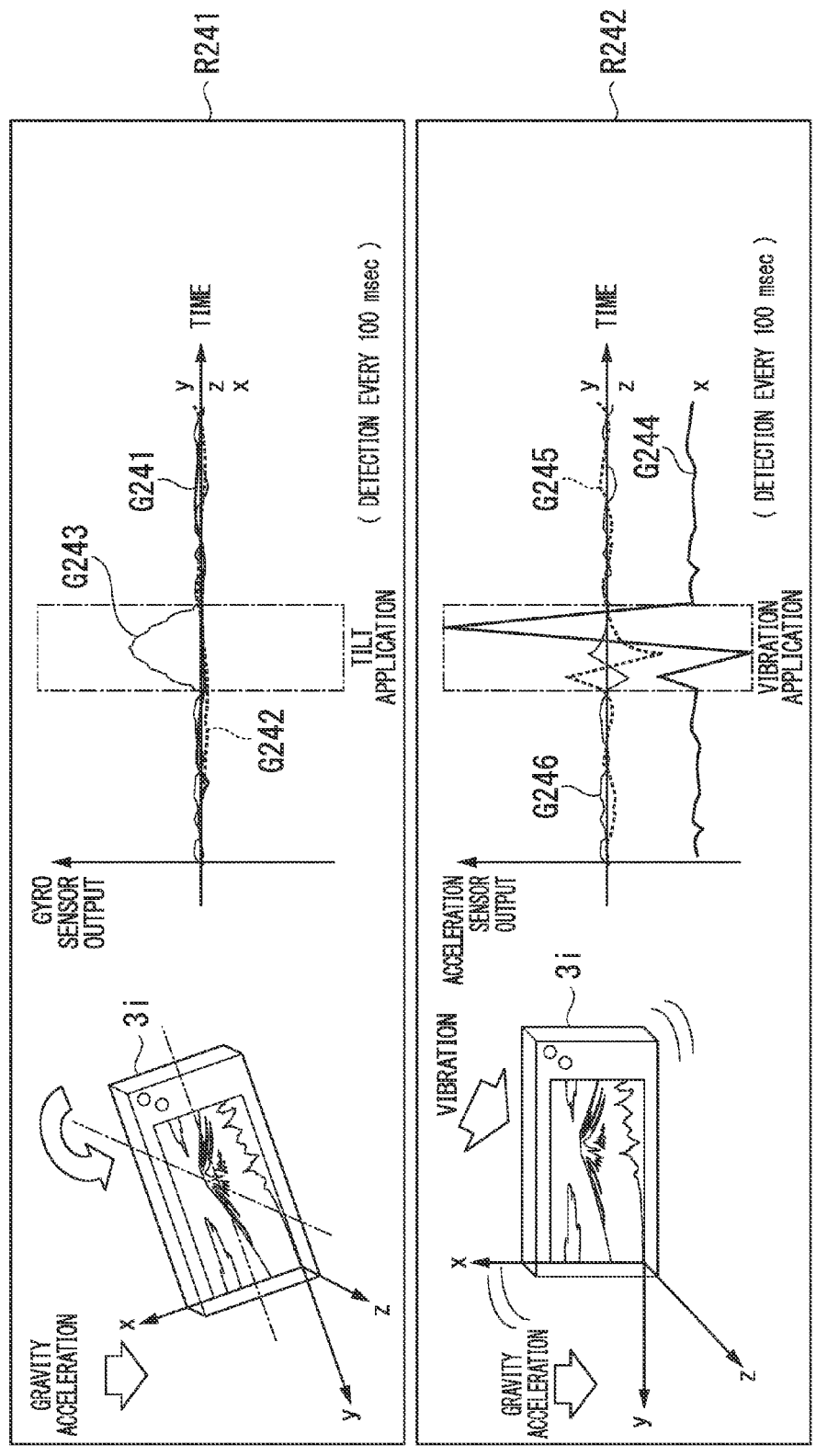

FIG. 24

| No. | ACCELERATION SENSOR | GYRO SENSOR | TERRESTRIAL MAGNETISM SENSOR | OPERATION | REMARKS |
|---|---|---|---|---|---|
| 1 | OUTPUT VARIATION GREATER THAN OR EQUAL TO THRESHOLD VALUE WITHIN A sec (ONE OR MORE AXES) | — | — | SHOOTING (SINGLE SHOOTING) | A, FOR EXAMPLE, IS 0.5. RAPID VARIATION |
| 2 | OUTPUT VARIATION AMOUNT PER UNIT TIME GREATER THAN OR EQUAL TO PREDETERMINED VALUE (ONE OR MORE AXES) | — | — | SHOOTING (SINGLE SHOOTING) | OUTPUT VARIATION AMOUNT PER UNIT TIME = TILT. RAPID VARIATION |
| 3 | WHEN NO. 1 IS DETECTED CONTINUOUSLY N OR MORE TIMES | — | — | SHOOTING (CONTINUOUS SHOOTING) | N, FOR EXAMPLE, IS 2. RAPID VARIATION |
| 4 | WHEN NO. 2 IS DETECTED IN SAME SIGN CONTINUOUSLY N OR MORE TIMES | — | — | SHOOTING (CONTINUOUS SHOOTING) | N, FOR EXAMPLE, IS 2. RAPID VARIATION |
| 5 | OUTPUT VARIATION GREATER THAN OR EQUAL TO FOURTH THRESHOLD VALUE FOR TIME EXCEEDING A sec (ONE OR MORE AXES) | — | — | MOVEMENT OF IMAGING PARAMETER CANDIDATE TO BE SELECTED (MOVEMENT DIRECTION AND SPEED OF MOVEMENT SIGN IS DETERMINED CONVERSION BY IS VARIED BY MAGNITUDE OF ABSOLUTE VALUE) | A, FOR EXAMPLE, IS 0.5. RAPID VARIATION |
| 6 | OUTPUT VARIATION AMOUNT PER UNIT TIME LESS THAN OR EQUAL TO PREDETERMINED VALUE (ONE OR MORE AXES) | — | — | SAME AS IN NO. 5 | OUTPUT VARIATION AMOUNT PER UNIT TIME = TILT. SLOW VARIATION |
| 7 | COMBINATION OF ANY ONE OF NOS. 1 AND EITHER OF NOS. 5 AND 6 | — | — | SHOOTING PRIORITY | |
| 8 | — | OUTPUT VARIATION GREATER THAN OR EQUAL TO THRESHOLD VALUE FOR TIME EXCEEDING A sec (ONE OR MORE AXES) | — | SAME AS IN NO. 5 | |
| 9 | — | OUTPUT VARIATION AMOUNT PER UNIT TIME LESS THAN OR EQUAL TO PREDETERMINED VALUE (ONE OR MORE AXES) | — | SAME AS IN NO. 5 | |
| 10 | — | — | OUTPUT VARIATION GREATER THAN OR EQUAL TO THRESHOLD VALUE FOR TIME EXCEEDING A sec (ONE OR MORE AXES) | SAME AS IN NO. 5 | A, FOR EXAMPLE, IS 0.5. RAPID VARIATION |
| 11 | — | — | OUTPUT VARIATION AMOUNT PER UNIT TIME LESS THAN OR EQUAL TO PREDETERMINED VALUE (ONE OR MORE AXES) | SAME AS IN NO. 5 | OUTPUT VARIATION AMOUNT PER UNIT TIME = TILT. RAPID VARIATION |
| 12 | COMBINATION OF ANY ONE OF NOS. 1 TO 4 AND EITHER OF NOS. 5 AND 6 | EITHER OF NOS. 8 AND 9 | — | SHOOTING PRIORITY | SELECTION OF IMAGING PARAMETER IS CASE IN WHICH ACCELERATION SENSOR HAS PRIORITY AND CASE IN WHICH GYRO SENSOR HAS PRIORITY |
| 13 | COMBINATION OF ANY ONE OF NOS. 1 TO 4 AND EITHER OF NOS. 5 AND 6 | — | EITHER OF NOS. 10 AND 11 | SHOOTING PRIORITY | SELECTION OF IMAGING PARAMETER IS CASE IN WHICH ACCELERATION SENSOR HAS PRIORITY AND CASE IN WHICH TERRESTRIAL MAGNETISM SENSOR HAS PRIORITY |
| 14 | COMBINATION OF ANY ONE OF NOS. 1 TO 4 AND EITHER OF NOS. 5 AND 6 | EITHER OF NOS. 8 AND 9 | EITHER OF NOS. 10 AND 11 | SHOOTING PRIORITY | SELECTION OF IMAGING PARAMETER IS CASE IN WHICH EACH SENSOR HAS PRIORITY |

CHANGE OF PARAMETER OTHER THAN ZOOM

ZOOM CHANGE

SHOOTING IN VIBRATION

IMAGING INSTRUCTION TERMINAL, IMAGING SYSTEM, IMAGING INSTRUCTION METHOD, AND PROGRAM DEVICE

BACKGROUND OF THE INVENTION

1. Field of the Invention

The present invention relates to an imaging instruction terminal, an imaging system, an imaging instruction method, and a program device.

Priority is claimed on Japanese Patent Application No. 2013-054344, filed Mar. 15, 2013, the content of which is incorporated herein by reference.

2. Description of the Related Art

In the related art, technology for instructing a camera main body to perform imaging from a remote place using a remote controller is known. For example, Japanese Unexamined Patent Application, First Publication No. H11-174576 relates to a camera having a camera main body from which the remote controller having an electronic viewfinder function is detachable. In Japanese Unexamined Patent Application, First Publication No. H11-174576, a camera by which a photographer can perform self shooting while checking the composition in an image displayed on the detached remote controller is disclosed.

SUMMARY

According to an aspect of the present invention, there is provided an imaging instruction terminal including: a communication module configured to communicate with an imaging device; a motion detection section configured to detect motion information about motion of the imaging instruction terminal; a command generation section configured to generate an instruction command related to imaging for the imaging device at a timing at which the motion information detected by the motion detection section has exceeded a predetermined threshold value; and a communication control section configured to cause the instruction command related to the imaging to be transmitted from the communication module to the imaging device when the command generation section has generated the instruction command related to the imaging.

In addition, according to an aspect of the present invention, there is provided an imaging system including an imaging device and an imaging instruction terminal configured to issue an instruction related to imaging to an imaging device, wherein the imaging instruction terminal includes: a communication module configured to communicate with the imaging device; a motion detection section configured to detect motion information about motion of the imaging instruction terminal; a command generation section configured to generate an instruction command related to the imaging for the imaging device at a timing at which the motion information detected by the motion detection section has exceeded a predetermined threshold value; and a communication control section configured to cause the instruction command related to the imaging to be transmitted from the communication module to the imaging device when the command generation section has generated the instruction command related to the imaging.

In addition, according to an aspect of the present invention, there is provided an imaging instruction method which is executed by an imaging instruction terminal including a communication module configured to communicate with an imaging device, the imaging instruction method including: detecting, by a motion detection section, motion information about motion of the imaging instruction terminal; generating, by a command generation section, an instruction command related to the imaging for the imaging device at a timing at which the motion information detected by the motion detection section has exceeded a predetermined threshold value; and causing, by a communication control section, the instruction command related to the imaging to be transmitted from the communication module to the imaging device when the command generation section has generated the instruction command related to the imaging.

In addition, according to an aspect of the present invention, there is provided a computer-readable storage device saving a computer program for causing an imaging instruction terminal, which includes a communication module configured to communicate with an imaging device and a motion detection section configured to detect motion information about motion of the imaging instruction terminal, to execute: a command generation step of generating an instruction command related to the imaging for the imaging device at a timing at which the motion information detected by the motion detection section has exceeded a predetermined threshold value; and a communication control step of causing the instruction command related to the imaging to be transmitted from the communication module to the imaging device when the instruction command related to the imaging has been generated in the command generation step.

BRIEF DESCRIPTION OF THE DRAWINGS

FIG. 23 is a diagram illustrating an example of processing of the imaging instruction terminal when the vibration detection sensor includes a triaxial acceleration sensor and a triaxial gyro sensor.

FIG. 24 is a table showing a set of output variations of each sensor provided in the imaging instruction terminal and an operation of the imaging instruction terminal.

DETAILED DESCRIPTION OF THE PREFERRED EMBODIMENTS (First Embodiment)

Figure 1:
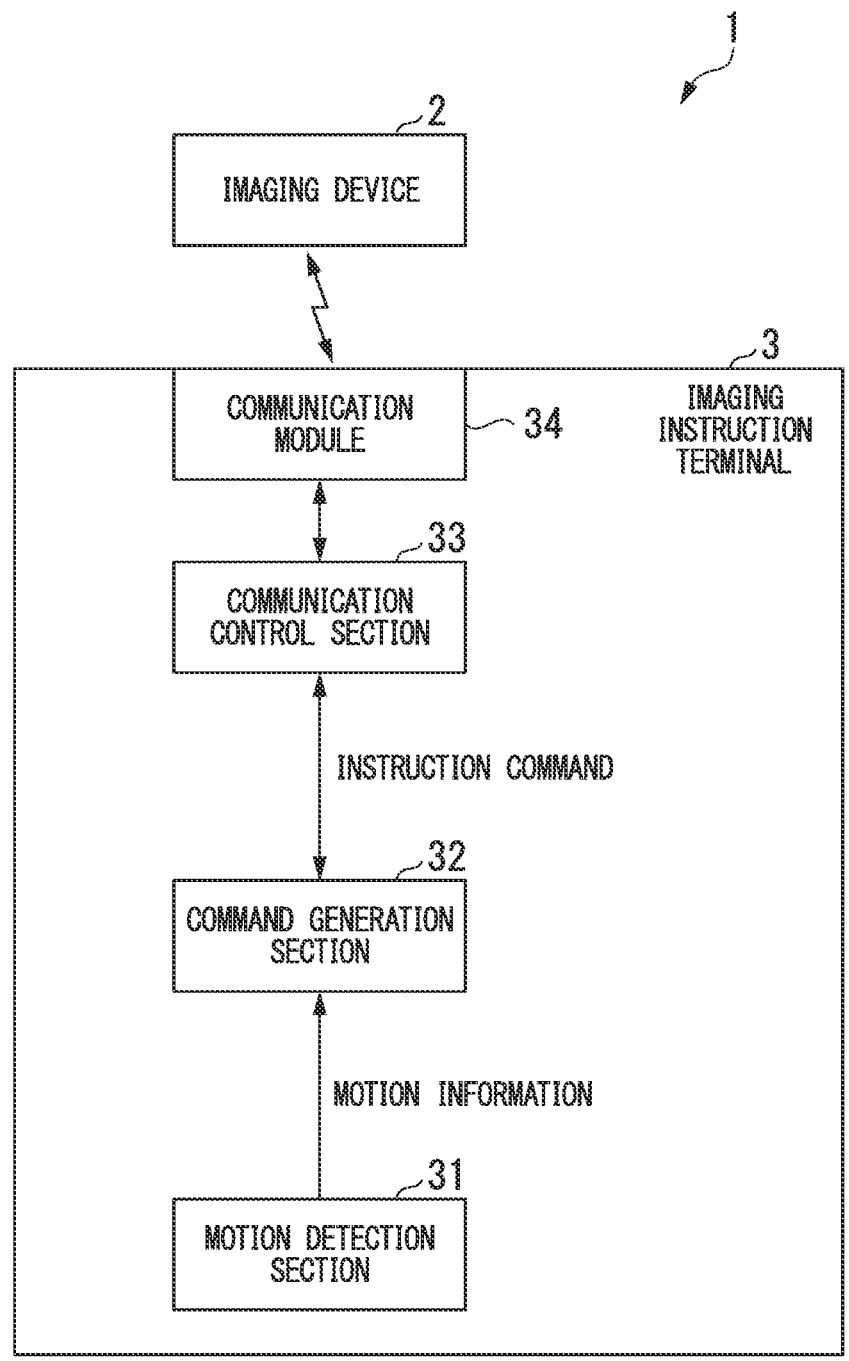
FIG. 1 is a schematic block diagram illustrating a configuration of an imaging system in a first embodiment.

Hereinafter, embodiments of the present invention will be described in detail with reference to the drawings. FIG. 1 is a schematic block diagram illustrating a configuration of an imaging system 1 in the first embodiment. The imaging system 1 includes an imaging device 2 and an imaging instruction terminal 3.

The imaging device 2 at least includes an imaging section (for example, an image sensor) configured to image a subject. Also, an optical module configured to guide light from the subject to the imaging section may be fixed to or detachable from the imaging device 2.

The imaging instruction terminal 3, for example, is a multifunctional portable terminal (so-called smartphone) or a tablet terminal. The imaging instruction terminal 3 includes a motion detection section 31, a command generation section 32, a communication control section 33, and a communication module 34.

The motion detection section 31 detects motion information about motion of its own terminal. The motion detection section 31, for example, is a sensor configured to detect the motion of its own terminal, and, for example, is an acceleration sensor, a gyro sensor, or a terrestrial magnetism sensor. Here, the motion information may be a sensor output at a certain time, a difference between sensor outputs at a plurality of times, a sensor output variation amount per unit time, or an absolute value of any one thereof. The motion detection section 31 outputs motion information obtained by the detection to the command generation section 32.

The command generation section 32 generates an instruction command related to imaging for the imaging device 2 at a timing at which the motion information detected by the motion detection section 31 has exceeded a predetermined threshold value (for example, an imaging instruction command for issuing an imaging instruction or an imaging parameter setting instruction command for issuing an instruction to set an imaging parameter), and outputs the generated instruction command to the communication control section 33.

When the instruction command related to the imaging has been input from the command generation section 32, the communication control section 33 causes the instruction command related to the imaging to be transmitted from the communication module 34 to the imaging device 2. Thereby, the communication module 34 transmits the instruction command to the imaging device 2. Thereby, the imaging device 2 receives the instruction command transmitted from the communication module 34, and performs a process according to the received instruction command. Also, communication between the communication module 34 and the imaging device 2 may be either wireless or wired communication.

Figure 2:
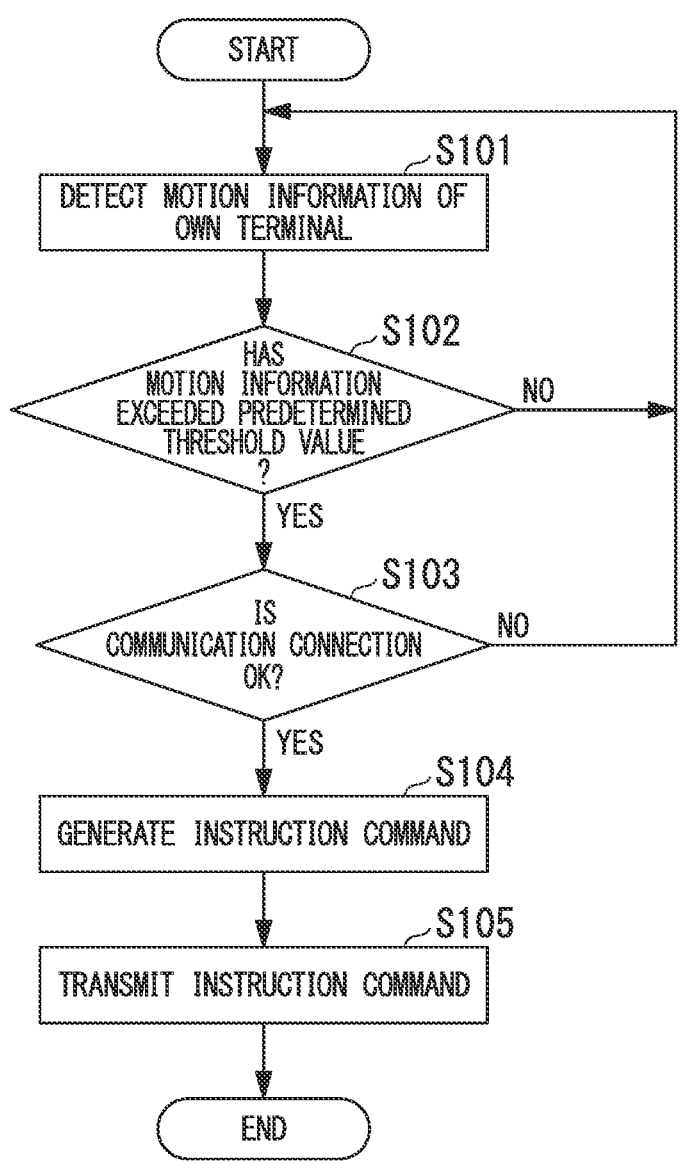
FIG. 2 is a flowchart illustrating an example of a processing flow of an imaging instruction terminal in the first embodiment.

FIG. 2 is a flowchart illustrating an example of a processing flow of the imaging instruction terminal 3 in the first embodiment.

(Step S101) First, the motion detection section 31 detects motion information about motion of its own terminal.

(Step S102) Next, the command generation section 32 determines whether the motion information has exceeded a predetermined threshold value. When the motion information has exceeded the threshold value (YES), the command generation section 32 proceeds to step S103. On the other hand, when the motion information has not exceeded the threshold value (NO), the command generation section 32 returns to step S101.

(Step S103) The command generation section 32 asks the communication control section 33 about a state of a communication connection with the imaging device 2, and acquires information representing the communication connection state. When the communication is established (YES), the command generation section 32 proceeds to step S104. On the other hand, when the communication is not established (NO), the command generation section 32 returns to step S101.

(Step S104) The command generation section 32 generates an instruction command related to imaging and outputs the generated instruction command to the communication control section 33.

(Step S105) Next, the communication control section 33 causes the instruction command input from the command generation section 32 to be transmitted from the communication module 34 to the imaging device 2. This ends the process of this flowchart.

Also, although the command generation section 32 checks the establishment of the communication, the present invention is not limited thereto. The establishment of the communication may not be checked.

In the above first embodiment, the command generation section 32 generates the instruction command related to the imaging for the imaging device 2 at a timing at which a motion variation amount has exceeded a predetermined threshold value, and the communication control section 33 causes the instruction command to be transmitted to the imaging device 2 when the instruction command is generated. Thereby, because the imaging instruction terminal 3 can issue an imaging instruction at the timing at which the motion variation of its own terminal has exceeded the threshold value, the imaging device 2 can perform imaging without missing a photo opportunity.

In addition, because a user can issue the imaging-related instruction to the imaging device 2 by merely moving the imaging instruction terminal 3, it is possible to reduce an erroneous operation by the user because he or she can issue an instruction to the imaging device 2 through an intuitive operation without viewing the imaging instruction terminal 3. Because the user can issue the imaging-related instruction to the imaging device 2 by merely moving the imaging instruction terminal 3, it is easy for the user to perform an operation with one hand. In particular, when the operation is performed in a state in which the imaging device 2 is held in one hand and the imaging instruction terminal 3 is held in the other hand, it is easy for the user to operate the imaging instruction terminal 3. In addition, because a shutter of the imaging device 2 can be released by merely moving the imaging instruction terminal 3, it is easier to select an imaging timing than when a button provided in the remote controller is pressed with a finger as in the related art.

In addition, for example, when the imaging instruction terminal 3 has a size capable of being held in one hand, the user can hold and shake the imaging instruction terminal 3 with the one hand. In this case, because the imaging instruction command is generated when the imaging instruction terminal 3 has been shaken and the imaging instruction command is transmitted to the imaging device 2 shortly thereafter, it is possible to release the shutter of the imaging device 2 at a reliable timing even when the user operates the imaging instruction terminal 3 with one hand. Further, for example, because it is possible to perform an operation while firmly holding the imaging instruction terminal 3 with the five fingers and the palm, the risk of dropping the imaging instruction terminal 3 can be reduced.

In addition, because it is possible to release the shutter of the imaging device 2 by merely moving the imaging instruction terminal 3, the user's finger can be used for a separate operation such as focus position designation or a zoom operation.

Also, the imaging instruction terminal 3 may include a display section configured to display an image (hereinafter, a through image) captured by the imaging device 2. In this case, because it is not necessary to press a button on a screen of the display section when the user issues the imaging-related instruction, there is a merit in that the finger does not interfere with an image displayed on the screen.

(Second Embodiment)

Figure 3:
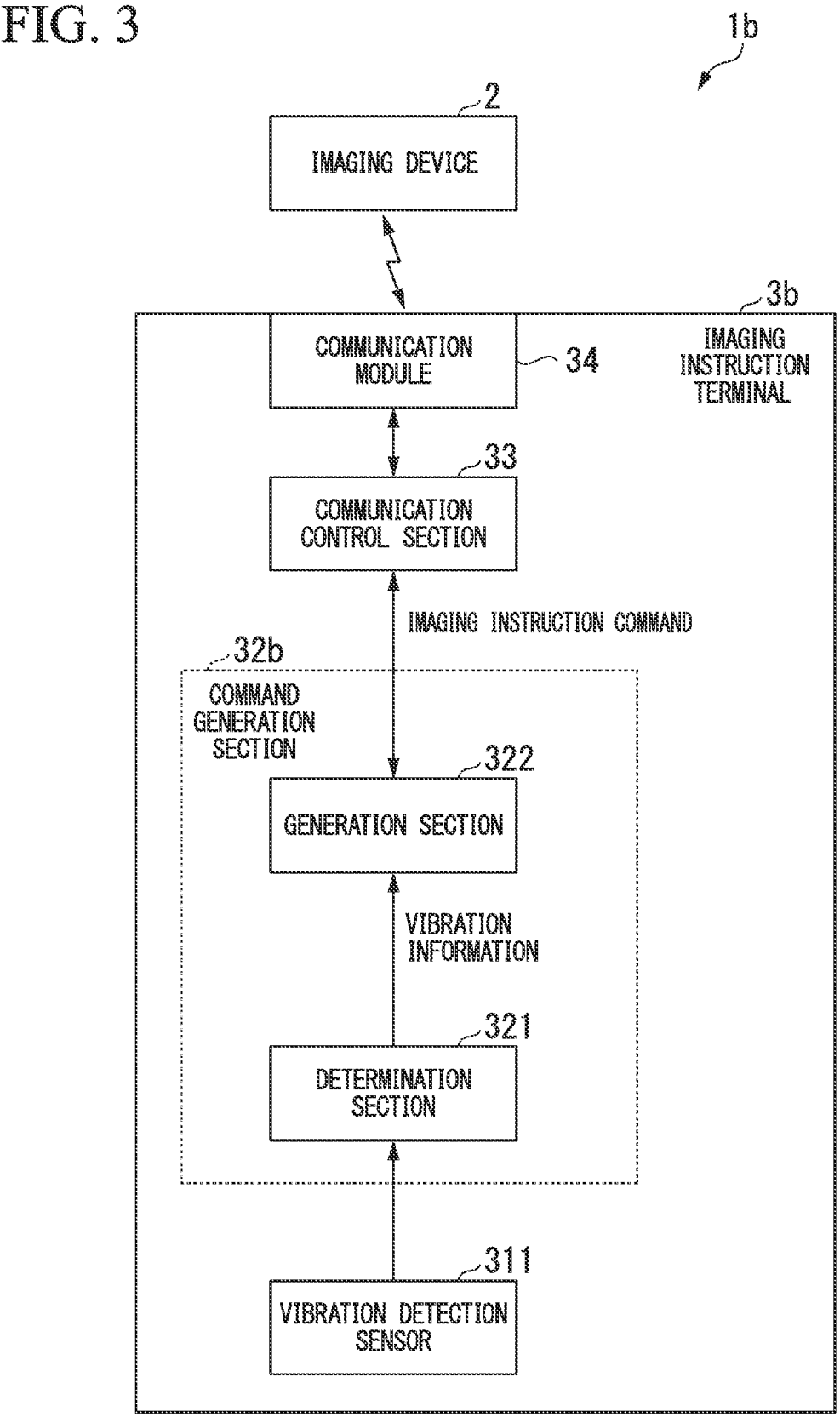
FIG. 3 is a schematic block diagram illustrating a configuration of an imaging system in a second embodiment.

Next, the second embodiment will be described. FIG. 3 is a schematic block diagram illustrating a configuration of an imaging system 1b in the second embodiment. The same reference signs are assigned to elements common with FIG. 1 and specific description thereof is omitted. The configuration of the imaging system 1b in the second embodiment is a configuration in which the imaging instruction terminal 3 is changed to an imaging instruction terminal 3b with respect to the configuration of the imaging system 1 in the first embodiment. The imaging instruction terminal 3b in the second embodiment is a configuration in which the motion detection section 31 is changed to a vibration detection sensor 311 and the command generation section 32 is changed to a command generation section 32b with respect to the configuration of the imaging instruction terminal 3 in the first embodiment. Here, the command generation section 32b includes a determination section 321 and a generation section 322.

The vibration detection sensor 311 detects vibration of its own terminal. For example, the vibration detection sensor 311 outputs a sensor output obtained by detection to the determination section 321. The vibration detection sensor 311, for example, is an acceleration sensor.

The determination section 321, for example, determines that the vibration detected by the vibration detection sensor 311 is an imaging instruction for the imaging device 2 at a timing at which the sensor output input from the vibration detection sensor 311 has exceeded a predetermined threshold value. Also, based on the sensor output input from the vibration detection sensor 311, the determination section 321 may determine a sensor output variation amount related to time variation of the sensor output and determine that the vibration detected by the vibration detection sensor 311 is the imaging instruction for the imaging device 2 at a timing at which the determined sensor output variation amount has exceeded the threshold value. Here, the sensor output variation amount, for example, is a difference between sensor outputs at a plurality of different times, a difference between an immediately previous sensor output and a current sensor output, a sensor output variation amount within a predetermined time, or a sensor output variation amount per unit time.

An example of a specific process of the determination section 321 will be described. The determination section 321 may determine that it is the imaging instruction when the difference between the sensor outputs at the plurality of different times is greater than or equal to a predetermined threshold value. As an example, the determination section 321 may determine that it is the imaging instruction when the difference between the immediately previous sensor output and the current sensor output is greater than or equal to a predetermined threshold value. As another example, the determination section 321 may determine that it is the imaging instruction when a difference between a reference value of a past sensor output (for example, an average of sensor outputs of a given past period) and a current sensor output is greater than or equal to a predetermined threshold value. As still another example, the determination section 321 may determine that it is the imaging instruction when there is a sensor output variation greater than or equal to a threshold value within a predetermined time. As still another example, the determination section 321 may determine that it is the imaging instruction when a sensor output variation amount per unit time is greater than or equal to a predetermined threshold value. Here, the sensor output variation amount per unit time is a tilt when the time variation of the sensor output is represented by a graph in which the vertical axis represents a sensor output and the horizontal axis represents a time.

Upon determining that it is the imaging instruction, the determination section 321 outputs the vibration information to the generation section 322.

When the vibration information has been input from the determination section 321, that is, when the determination section 321 determines that it is the imaging instruction, the generation section 322 generates an imaging instruction command for issuing the imaging instruction to the imaging device 2. The generation section 322 outputs a generated imaging instruction command to the communication control section 33.

Figure 4A:
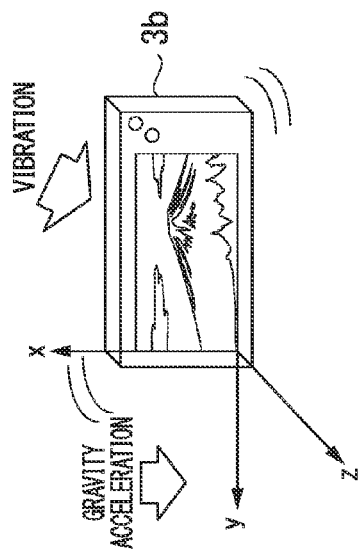
FIGS. 4A to 4C are diagrams each illustrating an example of processing of a determination section in the second embodiment.
Figure 4B:
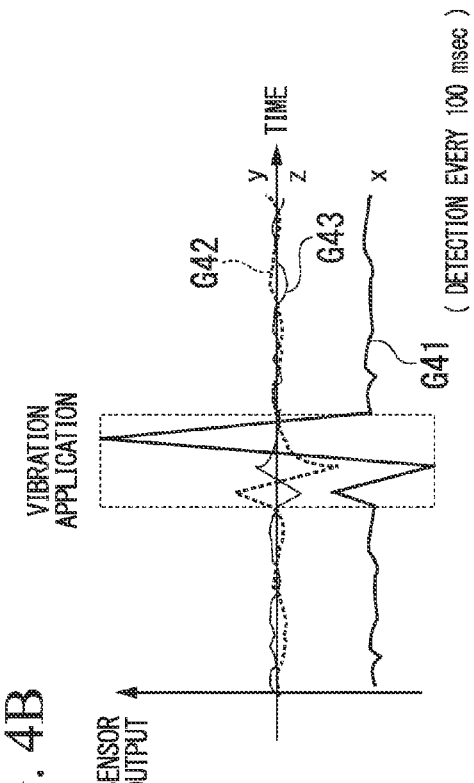
Figure 4C:
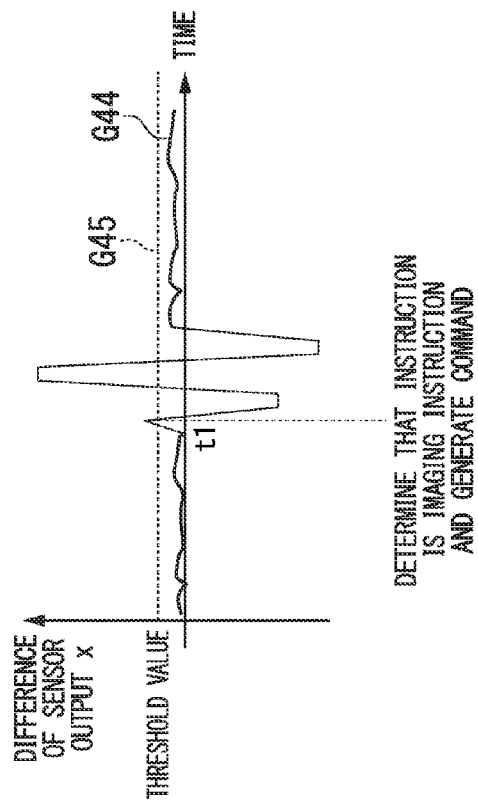

FIGS. 4A to 4C are diagrams each illustrating an example of processing of a determination section 321 in the second embodiment. FIGS. 4A to 4C are examples in which the determination section 321 determines that it is the imaging instruction when the difference between the immediately previous sensor output and the current sensor output of the vibration detection sensor 311 is greater than or equal to the threshold value. In FIG. 4A, an example when vibration is applied to the imaging instruction terminal 3b by swinging the imaging instruction terminal 3b to which an xyz coordinate system is allocated up in an x-axis positive direction is illustrated. An x axis is an axis in which an opposite direction to the direction of gravity acceleration is positive. In FIG. 4B, graphs of time variations of sensor outputs of the acceleration sensor before and after the vibration application when the vibration detection sensor 311 is a triaxial acceleration sensor are illustrated as an example. The graph of FIG. 4B is a polygonal line graph of the sensor output every 100 msec. A graph G41 is a graph representing time variation of the sensor output (hereinafter referred to as a sensor output x) of the acceleration sensor detecting the acceleration in the x-axis direction. A graph G42 is a graph representing time variation of a sensor output of the acceleration sensor detecting the acceleration in the y-axis direction. A graph G43 is a graph representing time variation of a sensor output of the acceleration sensor detecting the acceleration in the z-axis direction.

In FIG. 4C, a graph G44 representing time variation of a difference between the immediately previous sensor output x and the current sensor output x by a sensor output cycle (for example, 100 msec) is illustrated. In addition, a straight line G45 representing a threshold value is illustrated. In this example, the determination section 321 determines that it is the imaging instruction at a timing t1 at which the difference between the sensor output x of an immediately previous sensor output cycle (for example, 100 msec) and the current sensor output x first exceeds the threshold value, and the generation section 322 generates an imaging instruction command.

Figure 5:
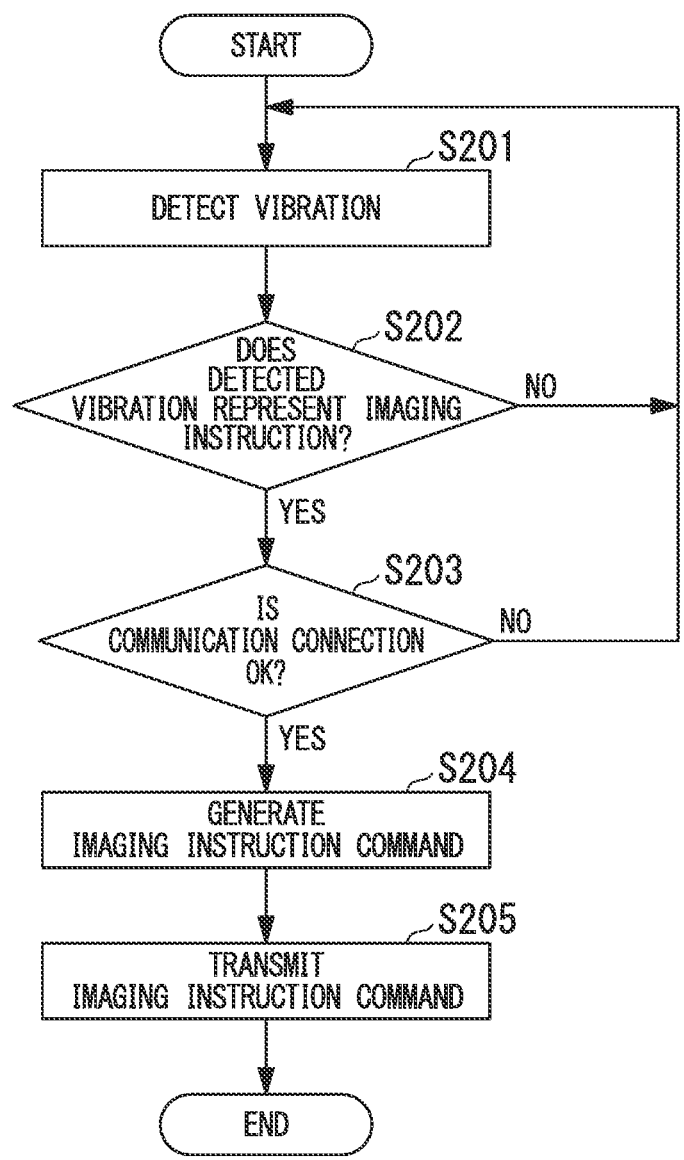
FIG. 5 is a flowchart illustrating an example of a processing flow of an imaging instruction terminal in the second embodiment.

FIG. 5 is a flowchart illustrating an example of a processing flow of an imaging instruction terminal 3b in the second embodiment.

(Step S201) First, when the imaging instruction terminal 3b is moved by the user and vibration is applied to the imaging instruction terminal 3b, the vibration detection sensor 311 detects the vibration of the imaging instruction terminal 3b, and, for example, outputs a sensor output to the determination section 321.

(Step S202) Next, the determination section 321, for example, determines whether the detected vibration is an imaging instruction based on the sensor output input from the vibration detection sensor 311. Specifically, for example, the determination section 321 determines whether a time variation amount of the sensor output is greater than or equal to a predetermined threshold value. When the time variation amount of the sensor output is greater than or equal to the predetermined threshold value (YES), the determination section 321 determines that the vibration detected by the vibration detection sensor 311 is the imaging instruction, outputs vibration information representing the imaging instruction to the generation section 322, and proceeds to step S203. When the time variation amount of the sensor output is not greater than or equal to the predetermined threshold value (NO), the determination section 321 determines that the vibration detected by the vibration detection sensor 311 is not the imaging instruction and returns to step S201.

(Step S203) Next, upon acquiring the vibration information, the generation section 322 asks the communication control section 33 about a state of a communication connection with the imaging device 2, and acquires information representing the communication connection state. When communication is established (YES), the generation section 322 proceeds to step S204. On the other hand, when the communication is not established (NO), the generation section 322 returns to step S201.

(Step S204) The generation section 322 generates an imaging instruction command.

(Step S205) Next, the communication control section 33 causes the imaging instruction command generated by the generation section 322 to be transmitted from the communication module 34 to the imaging device 2. This ends the process of this flowchart.

Also, although the command generation section 32b checks the establishment of the communication, the present invention is not limited thereto. The establishment of the communication may not be checked.

The imaging instruction terminal 3b of the above second embodiment generates and transmits the imaging instruction command at a timing at which a time variation amount of a sensor output input from the vibration detection sensor 311 is greater than or equal to a predetermined threshold value. Thereby, by applying the vibration to the imaging instruction terminal 3b, the imaging device 2 can perform imaging at the timing at which the time variation amount of the sensor output is greater than or equal to the predetermined threshold value. Thus, in addition to the advantageous effect of the first embodiment, the user can focus his/her attention on a subject during imaging and perform the imaging at an exact timing.

(Third Embodiment)

Figure 6:
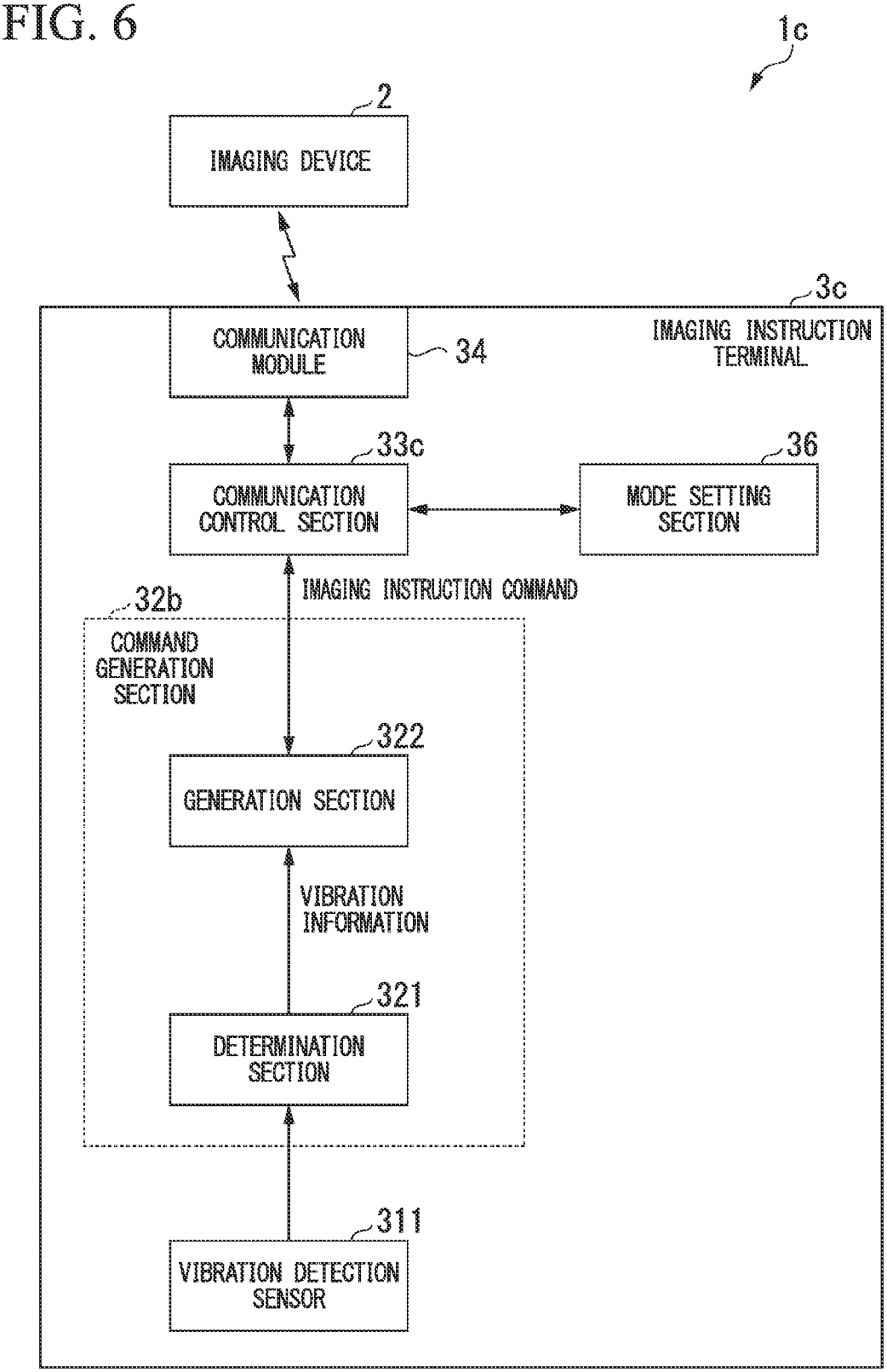
FIG. 6 is a schematic block diagram illustrating a configuration of an imaging system in a third embodiment.

Next, the third embodiment will be described. FIG. 6 is a schematic block diagram illustrating a configuration of an imaging system 1c in the third embodiment. Also, the same reference signs are assigned to elements common with FIG. 3 and specific description thereof is omitted. The configuration of the imaging system 1c in the third embodiment is a configuration in which the imaging instruction terminal 3b is changed to an imaging instruction terminal 3c with respect to the configuration of the imaging system 1b in the second embodiment. The imaging instruction terminal 3c in the third embodiment is a configuration in which the communication control section 33 is changed to a communication control section 33c and a mode setting section 36 is added with respect to the configuration of the imaging instruction terminal 3b in the second embodiment.

The mode setting section 36 sets an imaging mode in which an instruction command related to imaging is transmitted to the imaging device 2 and a non-imaging mode in which the instruction command related to the imaging is not transmitted to the imaging device 2. For example, when the vibration detection sensor 311 has detected vibration less than the above-described threshold value and exceeding a second threshold value, the mode setting section 36 may switch the mode. Here, the second threshold value is less than the threshold value. Thereby, because the user can set the mode by applying the vibration which does not exceed the threshold value to the imaging instruction terminal 3c, convenience for the user is improved.

For example, the mode setting section 36 may cause a mode switching button to be displayed on a touch panel (not illustrated) provided in the imaging instruction terminal 3c. In this case, when there is a tap at a position on the touch panel corresponding to the mode switching button, the mode setting section 36 may switch the mode if the vibration detection sensor 311 has detected the vibration less than the above-described threshold value and exceeding the second threshold value. Here, the tap is an operation of lightly tapping the touch panel with a finger once. Thereby, because the user can set the mode by tapping at a position on the touch panel corresponding to the mode switching button displayed on the imaging instruction terminal 3c, convenience for the user is improved.

In addition, the mode setting section 36 may switch the mode when the vibration detection sensor 311 has continuously detected the vibration less than the above-described threshold value and exceeding the second threshold value a plurality of times. Thereby, because the mode can be set when the user has continuously applied a plurality of (for example, two) vibrations (for example, when the user has continuously tapped), convenience for the user is improved.

During the imaging mode, the communication control section 33c causes the imaging instruction command generated by the command generation section 32b to be transmitted from the communication module 34 to the imaging device 2. On the other hand, during the non-imaging mode, the communication control section 33c does not cause the imaging instruction command generated by the command generation section 32b to be transmitted from the communication module 34 to the imaging device 2.

Also, when the mode is set to the imaging mode, an operation on the touch panel (not illustrated) provided in the imaging instruction terminal 3c may be locked. Thereby, an erroneous operation can be prevented.

Figure 7:
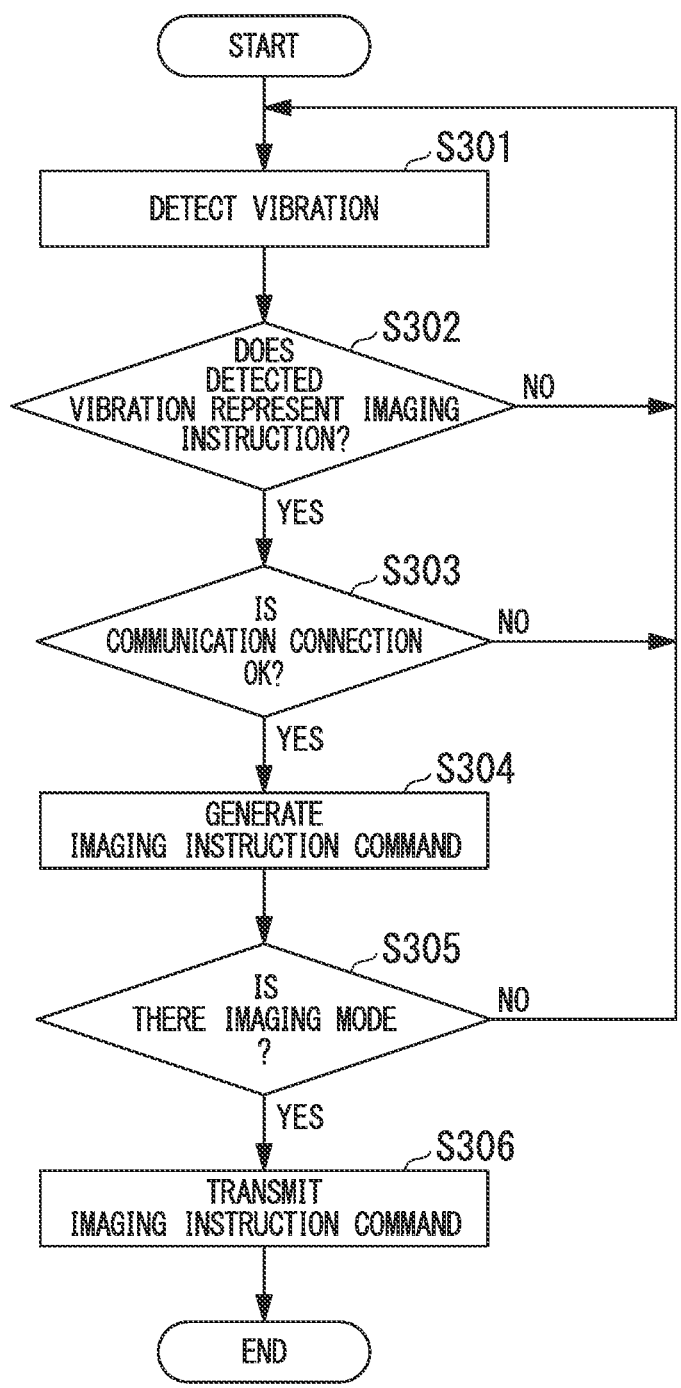
FIG. 7 is a flowchart illustrating an example of a processing flow of an imaging instruction terminal in the third embodiment.

FIG. 7 is a flowchart illustrating an example of a processing flow of the imaging instruction terminal in the third embodiment. Because processes of steps S301 to S304 are the same as steps S201 to S204 of FIG. 5, description thereof is omitted.

(Step S305) When the imaging instruction command is acquired from the generation section 322, the communication control section 33c checks the mode of a time at which the imaging instruction command has been acquired through the mode setting section 36. When the mode is the imaging mode (YES), the communication control section 33c proceeds to step S306. When the mode is not the imaging mode (NO), the communication control section 33c returns to step S301.

Because the process of step S306 is the same as step S205 of FIG. 5, description thereof is omitted.

Also, although the command generation section 32b checks the establishment of the communication, the present invention is not limited thereto. The establishment of the communication may not be checked.

In the imaging instruction terminal 3c of the above third embodiment, the communication control section 33c causes the imaging instruction command to be transmitted to the imaging device 2 only if the mode of a time at which the imaging instruction command has been acquired is the imaging mode. Thereby, because the imaging device 2 performs imaging only in the imaging mode even when there is vibration greater than or equal to a threshold value, there is an advantageous effect in that the imaging at a timing unintended by the user can be reduced in addition to the advantageous effect of the second embodiment.

Also, the generation section 322 may generate the imaging instruction command only during the imaging mode. Thereby, the generation of an ineffective command and the transmission/reception of the ineffective command are reduced and a processing load is reduced. In addition, the determination section 321 may generate vibration information only during the imaging mode. Thereby, generation of ineffective vibration information, the generation of the ineffective command, and the transmission/reception of the ineffective command are reduced, and the processing load is reduced. In addition, the vibration detection sensor 311 may output a sensor output only during the imaging mode. Thereby, an ineffective sensor output, the generation of the ineffective vibration information, the generation of the ineffective command, and the transmission/reception of the ineffective command are reduced and the processing load is reduced.

(Fourth Embodiment)

Figure 8:
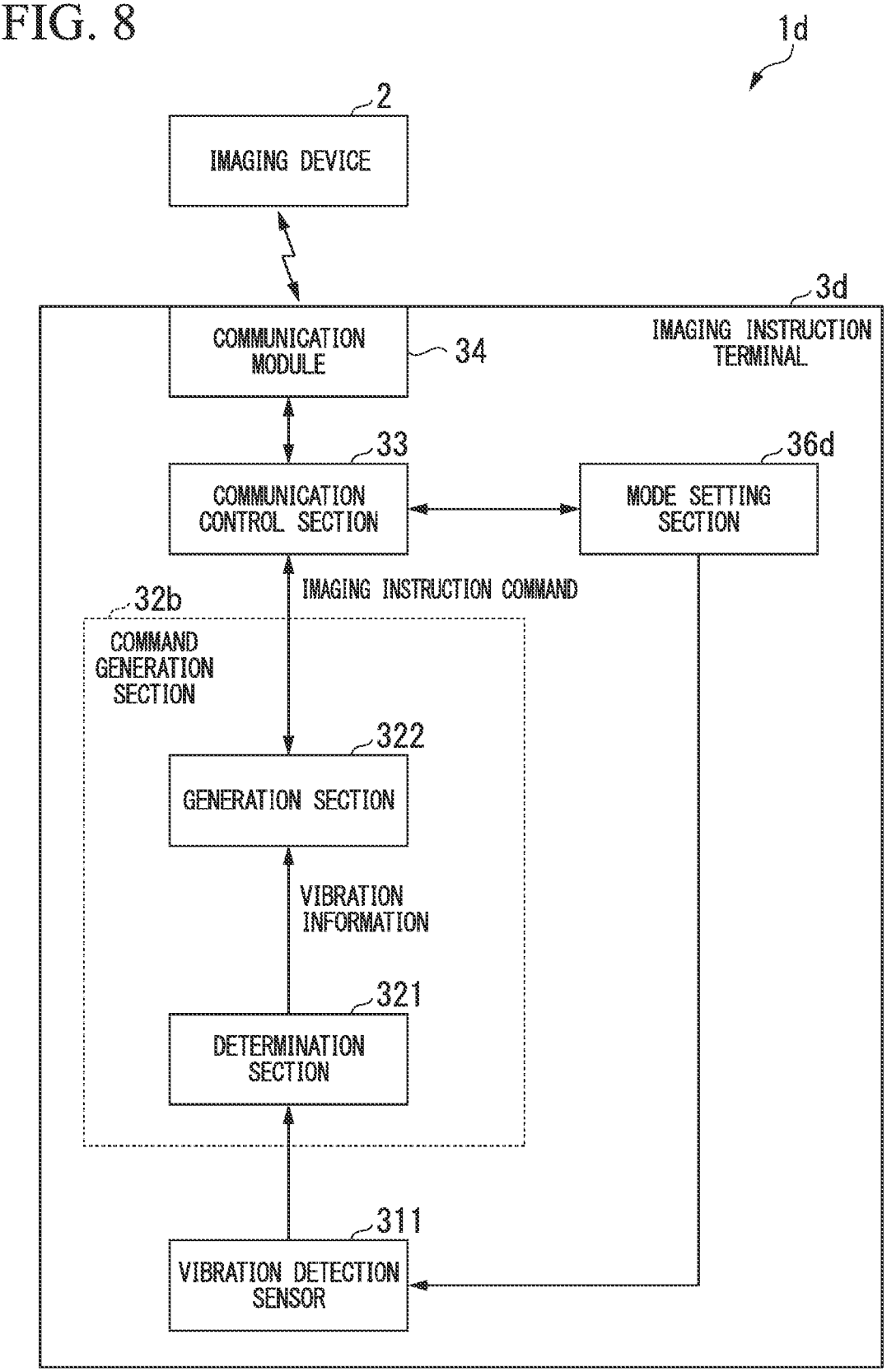
FIG. 8 is a schematic block diagram illustrating a configuration of an imaging system in a fourth embodiment.

Next, the fourth embodiment will be described. FIG. 8 is a schematic block diagram illustrating a configuration of an imaging system 1d in the fourth embodiment. Also, the same reference signs are assigned to elements common with FIG. 6 and specific description thereof is omitted. The configuration of the imaging system 1d in the fourth embodiment is a configuration in which the imaging instruction terminal 3c is changed to an imaging instruction terminal 3d with respect to the configuration of the imaging system 1c in the third embodiment. The imaging instruction terminal 3d in the fourth embodiment is a configuration in which the mode setting section 36 is changed to a mode setting section 36d with respect to the configuration of the imaging instruction terminal 3c of the third embodiment.

The mode setting section 36d has a function similar to that of the mode setting section 36 and further has the following functions. When the mode has been switched to the non-imaging mode, the mode setting section 36d turns off the power of the vibration detection sensor 311. When the mode has been switched to the imaging mode, the mode setting section 36d turns on the power of the vibration detection sensor 311. That is, the mode setting section 36d causes the power to be supplied to the vibration detection sensor 311 during the imaging mode and does not cause the power to be supplied to the vibration detection sensor 311 during the non-imaging mode. Thereby, it is possible to reduce power consumption of the vibration detection sensor 311.

In the imaging instruction terminal 3d in the above fourth embodiment, the power of the vibration detection sensor 311 is turned off when the mode setting section 36d switches the mode to the non-imaging mode, and the power of the vibration detection sensor 311 is turned on when the mode is switched to the imaging mode. Thereby, in addition to the advantageous effect of the third embodiment, there is an advantageous effect in that the power consumption of the vibration detection sensor 311 can be reduced.

(Fifth Embodiment)

Figure 9:
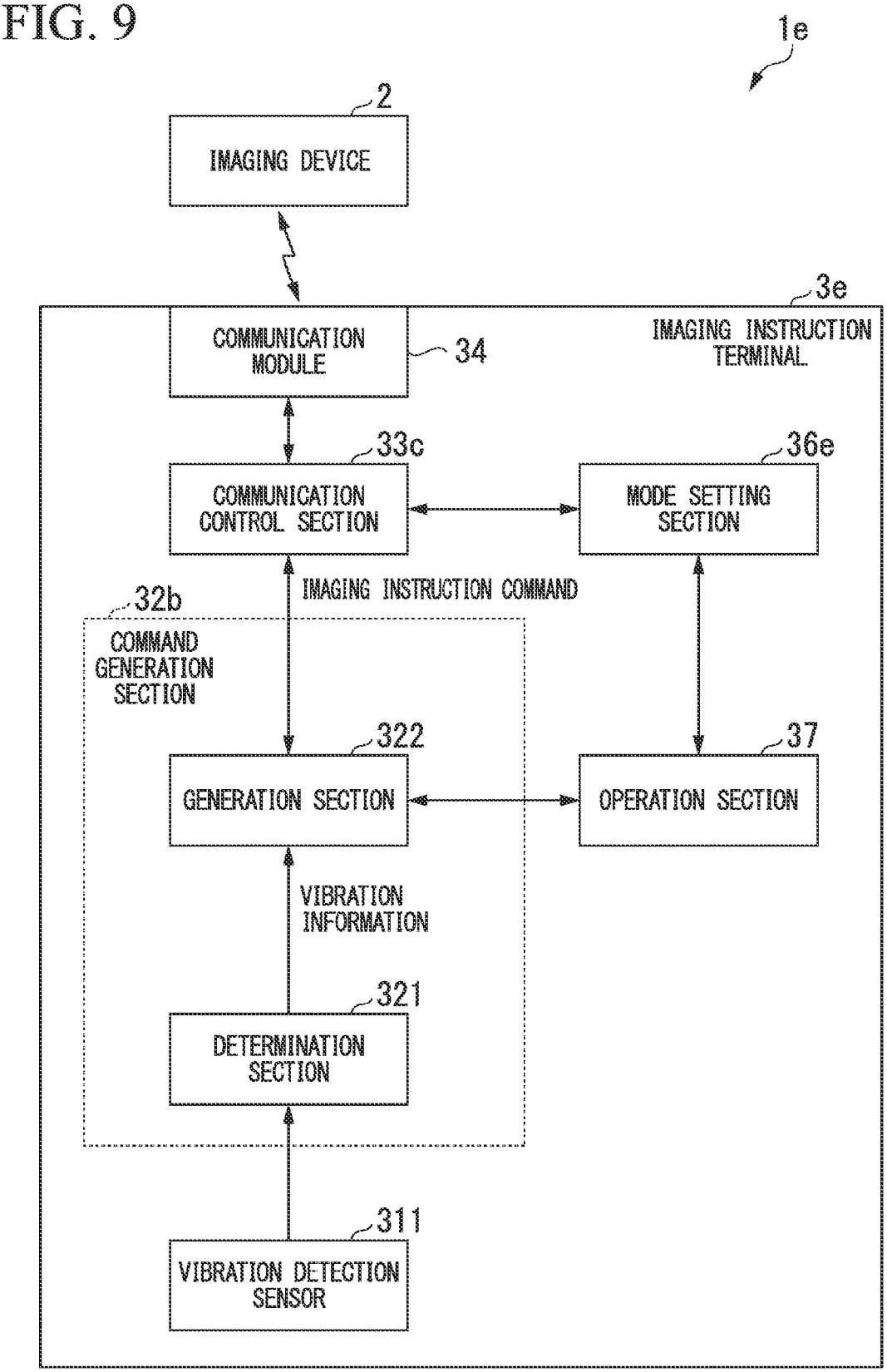
FIG. 9 is a schematic block diagram illustrating a configuration of an imaging system in a fifth embodiment.

Next, the fifth embodiment will be described. FIG. 9 is a schematic block diagram illustrating a configuration of an imaging system 1e in the fifth embodiment. Also, the same reference signs are assigned to elements common with FIG. 6 and specific description thereof is omitted. The configuration of the imaging system 1e in the fifth embodiment is a configuration in which the imaging instruction terminal 3c is changed to an imaging instruction terminal 3e with respect to the configuration of the imaging system 1c in the third embodiment. The imaging instruction terminal 3e in the fifth embodiment is a configuration in which an operation section 37 is added and the mode setting section 36 is changed to a mode setting section 36e with respect to the configuration of the imaging instruction terminal 3c of the third embodiment.

The operation section 37 receives an operation in which the user selects the imaging mode or the non-imaging mode, and outputs operation information representing the received operation to the mode setting section 36e. The operation section 37 can set the first operation state and the second operation state according to the received operation. The operation section 37, for example, is a touch panel. Also, the operation section 37 may be a push button, the push button may be an automatic reset type switch in which the switch is turned on during pushing or a position holding type switch in which ON and OFF are reversed for every push operation.

The mode setting section 36e has a function similar to that of the mode setting section 36 of the third embodiment, and further has the following function. The mode setting section 36e sets the imaging mode or the non-imaging mode based on the operation information input from the operation section 37, that is, an operation received by the operation section 37.

Figure 10:
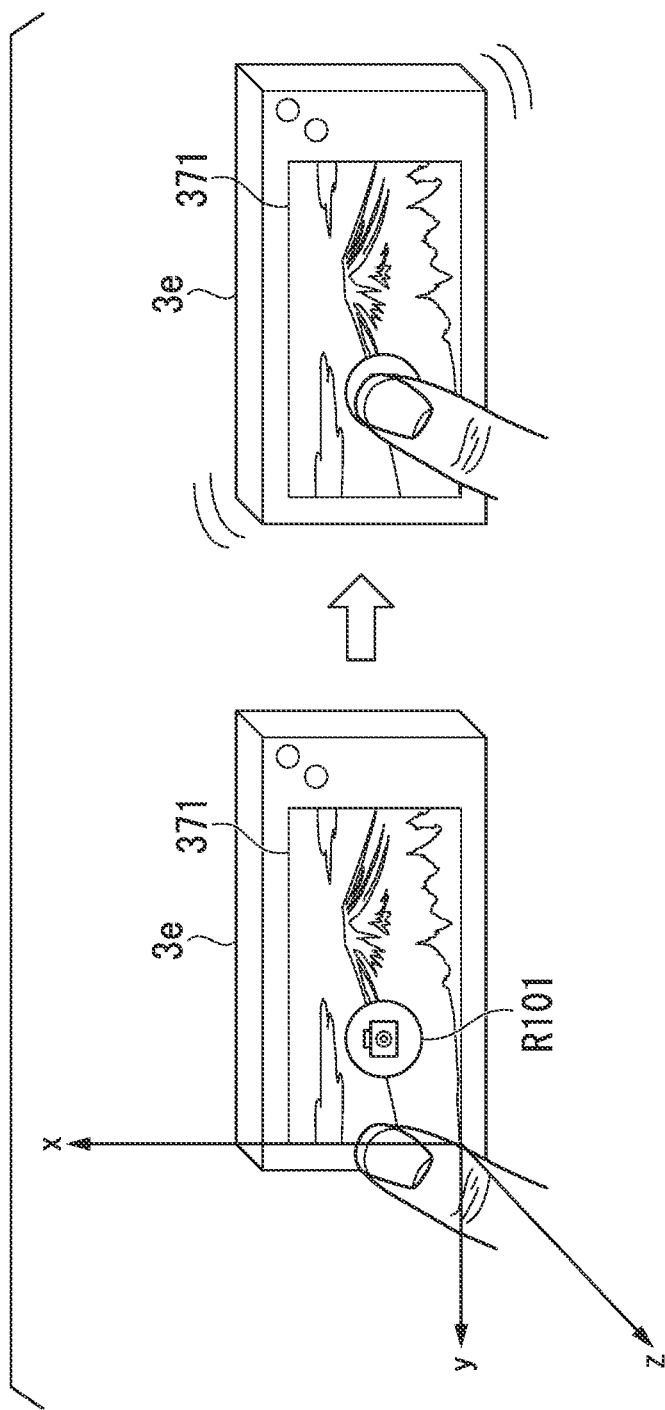
FIG. 10 is a diagram illustrating an example of processing of a mode setting section when an imaging instruction terminal has a touch panel in the fifth embodiment.

FIG. 10 is a diagram illustrating an example of processing of the mode setting section 36e when the imaging instruction terminal 3e has a touch panel in the fifth embodiment. In FIG. 10, xyz axes are allocated to the imaging instruction terminal 3e on the left and an operation button R101 is displayed on the touch panel 371. Here, when an operation body (for example, the user's finger) is in contact with a position on the surface of the touch panel 371 corresponding to a position of an xy plane on which the operation button R101 is displayed, the operation body is said to be in contact with the operation button R101. In a state in which the finger is not in contact with the operation button R101, the mode setting section 36e maintains the non-imaging mode. Thereby, even when the imaging instruction terminal 3e is shaken, the communication control section 33c does not cause the imaging instruction command to be transmitted from the communication module 34 and the imaging device 2 does not perform imaging.

On the other hand, the case in which the user's finger is in contact with the operation button R101 displayed on the touch panel 371 of the imaging instruction terminal 3e is illustrated on the right in FIG. 10. When the user's finger is in contact with the operation button R101, the mode setting section 36e switches the mode from the non-imaging mode to the imaging mode, and the mode setting section 36e maintains the imaging mode in a state in which the user's finger is in contact with the operation button R101. Thereby, because the communication control section 33c causes the imaging instruction command to be transmitted from the communication module 34 when the imaging instruction terminal 3e is shaken, the imaging device 2 performs imaging. When the user's finger is not in contact with the operation button R101, the mode setting section 36e sets the mode from the imaging mode to the non-imaging mode.

In this manner, in the example of FIG. 10, the mode setting section 36e sets the mode to the imaging mode while it is detected that the finger is in contact with the operation button R101 on the touch panel 371 and sets the mode to the non-imaging mode while it is not detected that the finger is in contact with the operation button R101 on the touch panel 371. Thereby, because the imaging instruction terminal 3e transmits the imaging instruction command to the imaging device 2 only while the finger is in contact with the operation button R101, it is possible to perform imaging at a timing at which vibration is applied only while the user pushes the operation button R101.

Also, although the mode setting section 36e maintains the imaging mode in a state in which the finger is in contact with the operation button R101 of the touch panel 371 in the example of FIG. 10, the present invention is not limited thereto. The mode may be set to the imaging mode when the finger is in contact with any position of the touch panel 371. In this manner, when the operation section 37, for example, is a touch panel, the operation section 37, for example, may detect whether the operation body (for example, the user's finger) is in contact with the touch panel (presence or absence of contact on the touch panel), maintain the first operation state when the operation body is in contact (when detecting presence of contact on the touch panel) and maintain the second operation state when the operation body is not in contact (when detecting absence of contact on the touch panel). In this case, the mode setting section 36e, for example, may set the mode to the imaging mode while the operation section 37 maintains the first operation state, that is, while the contact is detected, and set the mode to the non-imaging mode while the operation section 37 maintains the second operation state, that is, while the contact is not detected.

Also, when the operation section 37 is the push button, the operation section 37, for example, may maintain the first operation state when the push button is pressed once and maintain the second operation state different from the first operation state when the push button is pressed once more. In this case, the mode setting section 36e may set the mode to the imaging mode while the operation section 37 maintains the first operation state and set the mode to the non-imaging mode while the operation section 37 maintains the second operation state. Thereby, it is possible to set the mode every time the user presses the push button.

In the above fifth embodiment, the mode setting section 36e sets the mode to the imaging mode while it is detected that the finger is in contact with the operation button R101 displayed on the touch panel 371, and sets the mode to the non-imaging mode while it is not detected that the finger is in contact with the operation button R101 displayed on the touch panel 371. Thereby, because the imaging instruction terminal 3e transmits the imaging instruction command to the imaging device 2 only while it is detected that the finger is in contact with the operation button R101, it is possible to perform imaging at a timing at which vibration has been applied only while the user has pressed the operation button R101. Because it is possible to cause the imaging device 2 to perform the imaging by applying the vibration to the imaging instruction terminal 3e only during a user-intended period, there is an advantageous effect in that imaging at a timing unintended by the user (hereinafter also referred to as erroneous imaging) can be reduced in addition to the advantageous effect of the third embodiment.

(Sixth Embodiment)

Figure 11:
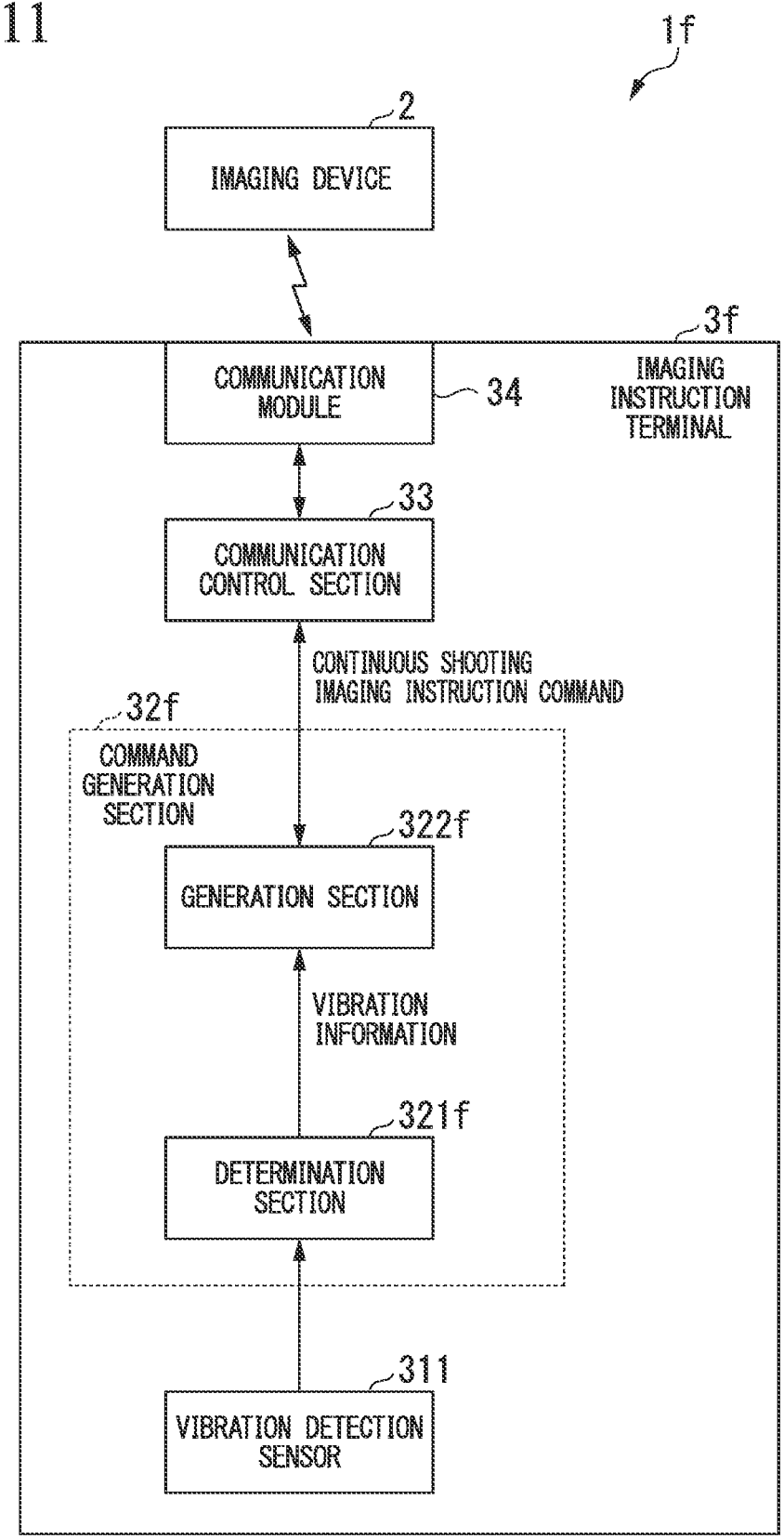
FIG. 11 is a schematic block diagram illustrating a configuration of an imaging system in a sixth embodiment.

Next, the sixth embodiment will be described. FIG. 11 is a schematic block diagram illustrating a configuration of an imaging system 1f in the sixth embodiment. Also, the same reference signs are assigned to elements common with FIG. 3 and specific description thereof is omitted. The configuration of the imaging system 1f in the sixth embodiment is a configuration in which the imaging instruction terminal 3b is changed to an imaging instruction terminal 3f with respect to the configuration of the imaging system 1b in the second embodiment. The imaging instruction terminal 3f in the sixth embodiment is a configuration in which the command generation section 32b is changed to a command generation section 32f with respect to the configuration of the imaging instruction terminal 3b in the second embodiment.

The command generation section 32f includes a determination section 321f and a generation section 322f.

The determination section 321f determines whether the vibration detected by the vibration detection sensor 311 is a continuous shooting instruction for the imaging device 2 based on a sensor output variation amount detected and obtained by the vibration detection sensor 311. Upon determining that the vibration is the continuous shooting instruction, the determination section 321f outputs vibration information representing the continuous shooting instruction to the generation section 322f.

When the determination section 321f determines that the vibration is the continuous shooting instruction, the generation section 322f outputs a continuous imaging instruction command for issuing a continuous shooting instruction for the imaging device 2 to the communication control section 33 or here continuously generates the imaging instruction command to continuously output the generated imaging instruction command to the communication control section 33.

Figure 12B:
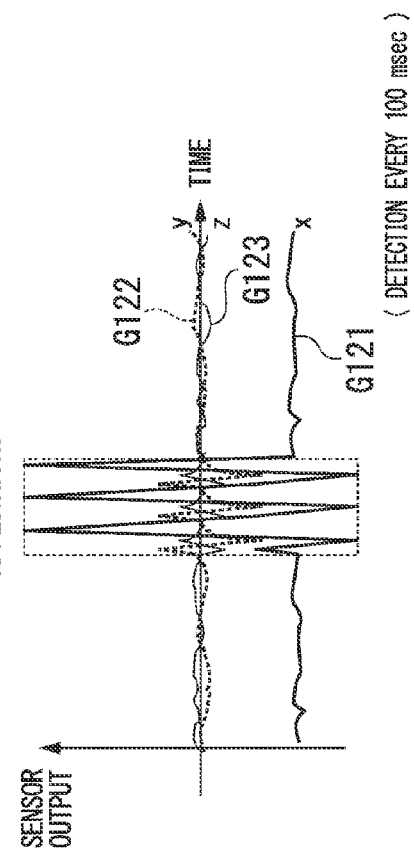
FIGS. 12A to 12C are diagrams each illustrating an example of processing of a determination section in the sixth embodiment.
Figure 12C:
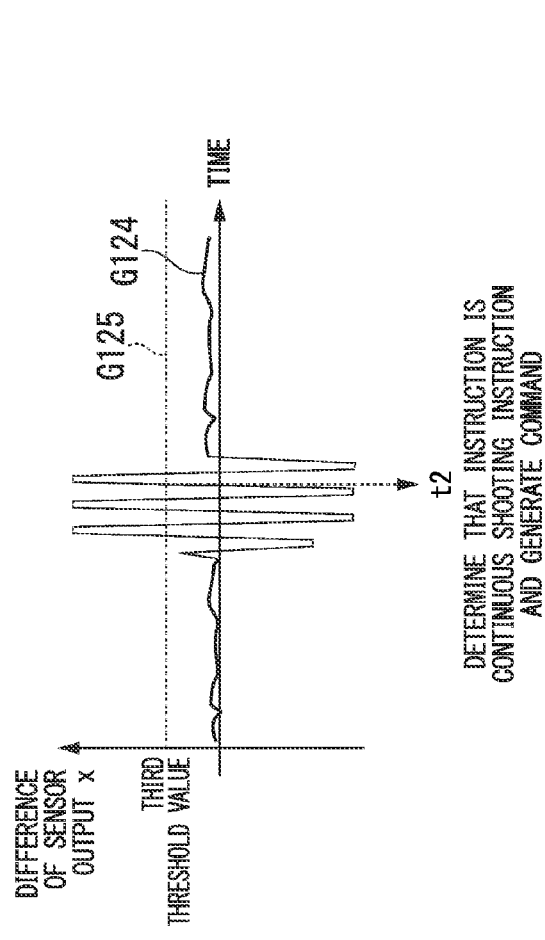
Figure 12A:
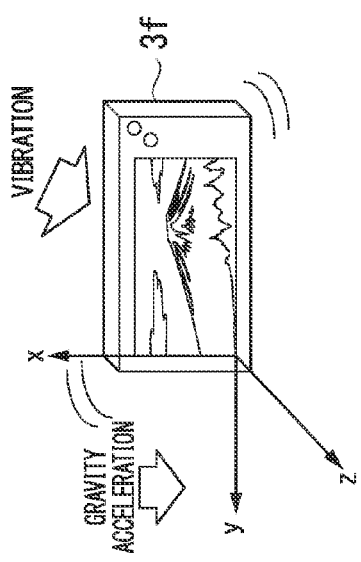

FIGS. 12A to 12C are diagrams each illustrating an example of processing of the determination section 321f in the sixth embodiment. FIGS. 12A to 12C are examples in which it is determined that the vibration is the continuous shooting instruction when the case in which a difference between an immediately previous sensor output and a current sensor output of the vibration detection sensor 311 is greater than or equal to a third threshold value has been detected three times. In FIG. 12A, an example when the vibration has been applied to the imaging instruction terminal 3f by shaking the imaging instruction terminal 3f to which the xyz coordinate system has been allocated three times in an x-axis direction is illustrated. An x axis is an axis in which an opposite direction to that of gravity acceleration is positive. In FIG. 12B, graphs of time variations of sensor outputs of the acceleration sensor before and after the vibration application when the vibration detection sensor 311 is a triaxial acceleration sensor are illustrated as an example. The graph of FIG. 12B is a polygonal line graph of the sensor output every 100 msec. A graph G121 is a graph representing time variation of the sensor output (hereinafter referred to as a sensor output x) of the acceleration sensor detecting the acceleration in the x-axis direction. A graph G122 is a graph representing time variation of a sensor output of the acceleration sensor detecting the acceleration in the y-axis direction. A graph G123 is a graph representing time variation of a sensor output of the acceleration sensor detecting the acceleration in the z-axis direction.

In FIG. 12C, a graph G124 representing time variation of a difference between the sensor output x of an immediately previous sensor output cycle (for example, 100 msec) and the current sensor output x is illustrated. In addition, a straight line G125 representing the third threshold value is illustrated. In this example, the determination section 321f determines that it is the continuous shooting instruction at a timing t2 at which the difference between the sensor output x of the immediately previous sensor output cycle (for example, 100 msec) and the current sensor output x exceeds the third threshold value at a third time, and the generation section 322f continuously generates an imaging instruction command.

Figure 13:
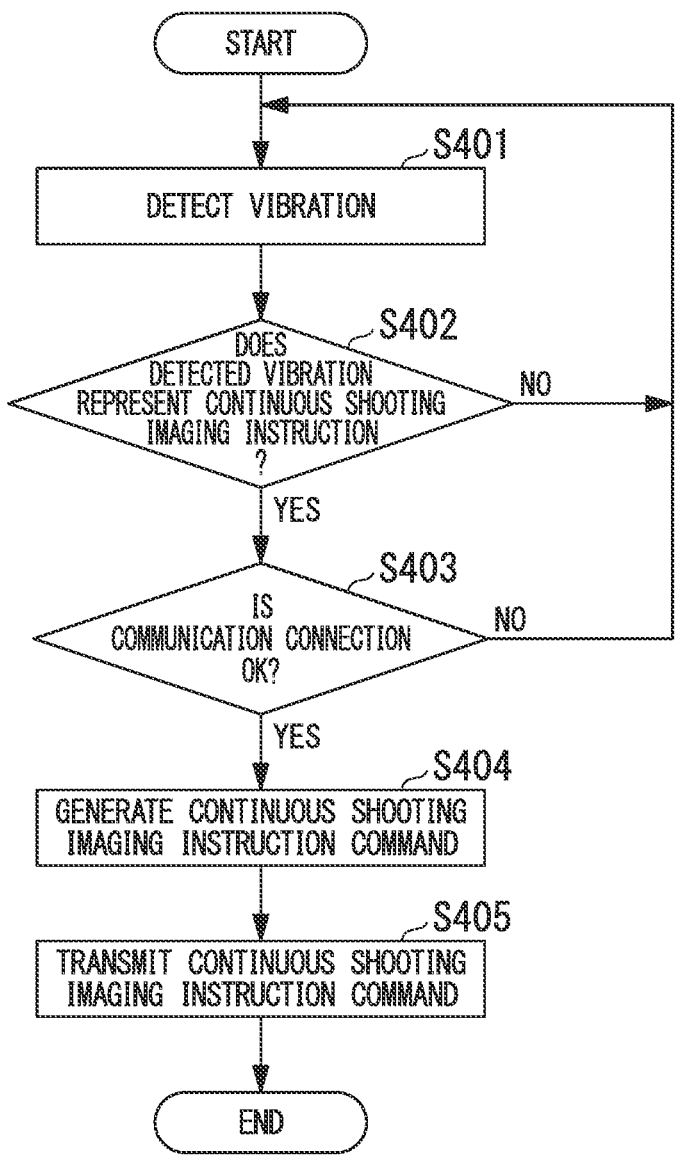
FIG. 13 is a flowchart illustrating an example of a processing flow of an imaging instruction terminal in the sixth embodiment.

FIG. 13 is a flowchart illustrating an example of a processing flow of the imaging instruction terminal 3f in the sixth embodiment.

(Step S401) First, when the imaging instruction terminal 3f is moved by the user and vibration is applied to the imaging instruction terminal 3f, the vibration detection sensor 311 detects the vibration of the imaging instruction terminal 3f, and outputs a sensor output to the determination section 321f.

(Step S402) Next, the determination section 321f determines whether the detected vibration is a continuous shooting instruction based on a time variation amount of the sensor output. When it is determined that the detected vibration is the continuous shooting instruction (YES), the determination section 321f outputs vibration information representing the continuous shooting instruction to the generation section 322f, and proceeds to step S403. When it is determined that the detected vibration is not the continuous shooting instruction (NO), the determination section 321f returns to step S401.

(Step S403) Next, upon acquiring the vibration information, the generation section 322f asks the communication control section 33 about a state of a communication connection with the imaging device 2, and acquires information representing the communication connection state. When communication is established (YES), the generation section 322f proceeds to step S404. On the other hand, when the communication is not established (NO), the generation section 322f returns to step S401.

(Step S404) Because the vibration information represents the continuous shooting instruction, the generation section 322f continuously generates an imaging instruction command.

(Step S405) Next, the communication control section 33 causes the continuous imaging instruction command generated by the generation section 322f to be transmitted from the communication module 34 to the imaging device 2 or causes the imaging instruction command to be continuously transmitted from the communication module 34. Thereby, the imaging device 2, for example, continuously performs imaging at a maximum continuous shooting speed of the imaging device 2 (hereinafter also referred to as continuous shooting). With this, the process of this flowchart ends.

Also, although the command generation section 32f checks the establishment of the communication, the present invention is not limited thereto. The establishment of the communication may not be checked.

Also, the determination section 321f, for example, may determine whether the detected vibration is a single shooting instruction or a continuous shooting instruction based on the time variation amount of the sensor output. When the detected vibration is the single shooting instruction, the determination section 321f may output the vibration information representing the single shooting instruction to the generation section 322f. In this case, because the vibration information represents the single shooting instruction, the generation section 322f may generate the imaging instruction command for instructing the imaging device 2 to perform the single shooting and the communication control section 33 may cause the generated imaging instruction command to be transmitted from the communication module 34 to the imaging device 2.

The imaging instruction terminal 3f of the above sixth embodiment generates and transmits the imaging instruction command at a timing at which the number of times that the time variation amount of the sensor output input from the vibration detection sensor 311 is greater than or equal to the predetermined threshold value has reached the predetermined number of times. Thereby, when the number of times that the time variation amount of the sensor output is greater than or equal to the threshold value in the imaging instruction terminal 3f is greater than or equal to the predetermined number of times, the imaging device 2 can start the continuous shooting. Thus, in addition to the advantageous effect of the second embodiment, the user can focus his/her attention on a subject during imaging and continuously perform the imaging at a reliable timing.

Also, when the time variation amount of the sensor output is less than or equal to a predetermined reference value, the imaging instruction terminal 3f may transmit a command for ending continuous shooting to the imaging device 2. Thereby, the imaging device 2 can end the continuous shooting when the vibration applied to the imaging instruction terminal 3f stops. Because it is possible to stop the continuous shooting when the user merely stops the vibration applied to the imaging instruction terminal 3f, the convenience for the user can be improved.

In addition, although an example in which the imaging device 2 performs the continuous shooting at a maximum continuous shooting speed of the imaging device 2 has been described in this embodiment, the present invention is not limited thereto. The continuous shooting may be performed according to vibration detected by the vibration detection sensor 311.

In addition, the command generation section 32f may continuously generate the imaging instruction command at a timing at which the time variation amount of the sensor output is greater than or equal to a predetermined threshold value and the communication control section 33 may cause the imaging instruction command to be continuously transmitted from the communication module 34 immediately when the imaging instruction command is continuously generated. Thereby, the imaging device 2 starts the continuous shooting from the start of the swinging of the imaging instruction terminal 3f, and then continues the continuous shooting when the determination section 321 determines that the instruction is the continuous shooting instruction thereafter. Thereby, because the imaging device 2 continuously performs imaging from when the swinging of the imaging instruction terminal 3f starts to when the determination section 321f determines the instruction as the continuous shooting instruction, it is possible to perform imaging without missing a photo opportunity during that period.

On the other hand, the command generation section 32f may generate a continuous shooting stop instruction command for issuing a continuous shooting stop instruction when it is determined that the instruction is not the continuous shooting instruction, and the communication control section 33 may cause the continuous shooting stop instruction command to be transmitted immediately when the continuous shooting stop instruction command is generated. Thereby, the imaging device 2 can start the continuous shooting from the start of the swinging of the imaging instruction terminal 3f, and stop the continuous shooting when the command generation section 32f determines that the instruction is not the continuous shooting instruction. At this time, the imaging device 2 may erase image data of an image captured thereafter except for image data of an initially captured image. Thereby, because ineffective imaging data can be erased except for one first image, it is possible to reduce the ineffective use of a capacity of a storage medium in which the imaging device 2 stores image data while performing imaging without missing a photo opportunity. Here, the storage medium may be embedded in the imaging device 2, and may be detachable as in various recording media (xD-picture card (registered trademark), a Secure Digital (SD) card, and a Compact Flash (registered trademark), etc.).

In addition, the determination section 321f may apply both a low pass filter and a high pass filter to a sensor output input from the vibration detection sensor 311.

(Seventh Embodiment)

Figure 14:
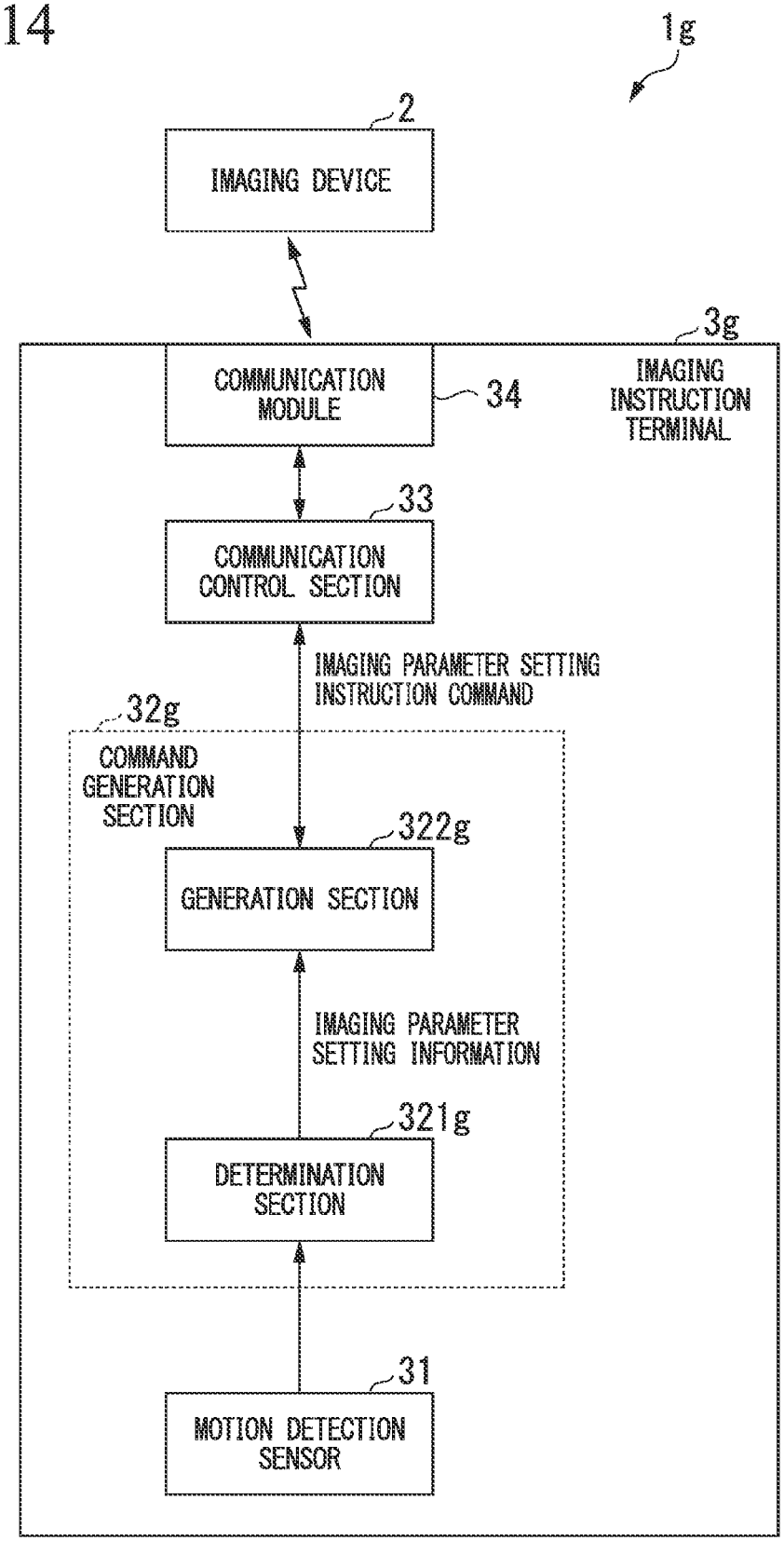
FIG. 14 is a schematic block diagram illustrating a configuration of an imaging system in a seventh embodiment.

Next, the seventh embodiment will be described. FIG. 14 is a schematic block diagram illustrating a configuration of an imaging system 1g in the seventh embodiment. The same reference signs are assigned to elements common with FIG. 1 and specific description thereof is omitted. The configuration of the imaging system 1g in the seventh embodiment is a configuration in which the imaging instruction terminal 3 is changed to an imaging instruction terminal 3g with respect to the configuration of the imaging system 1 in the first embodiment. The imaging instruction terminal 3g in the seventh embodiment is a configuration in which the command generation section 32 is changed to a command generation section 32g with respect to the configuration of the imaging instruction terminal 3 of the first embodiment.

The motion detection section 31, for example, includes an acceleration sensor, a gyro sensor, or a terrestrial magnetism sensor. The command generation section 32g includes a determination section 321g and a generation section 322g.

At a timing at which the motion information detected by the motion detection section 31 has exceeded a predetermined threshold value, the determination section 321g determines whether the motion information is an imaging parameter setting instruction for the imaging device 2. Upon determining that the motion information is the setting instruction for imaging parameters (for example, zoom-in, zoom-out, shutter speed, aperture, International Organization for Standardization (ISO) sensitivity, white balance, etc.), the determination section 321g outputs imaging parameter setting information about imaging parameter settings to the generation section 322g.

When the imaging parameter setting information has been input from the determination section 321g, that is, when the determination section 321g determines that it is the setting instruction, the generation section 322g generates an imaging parameter setting instruction command for issuing the imaging parameter setting instruction. The generation section 322g outputs the generated imaging parameter setting instruction command to the communication control section 33. When the imaging parameter setting instruction command has been input, the communication control section 33 causes the imaging parameter setting instruction command to be transmitted from the communication module 34 to the imaging device 2. Thereby, the imaging device 2 can change the imaging settings according to the imaging parameter setting instruction command.

Figure 15B:
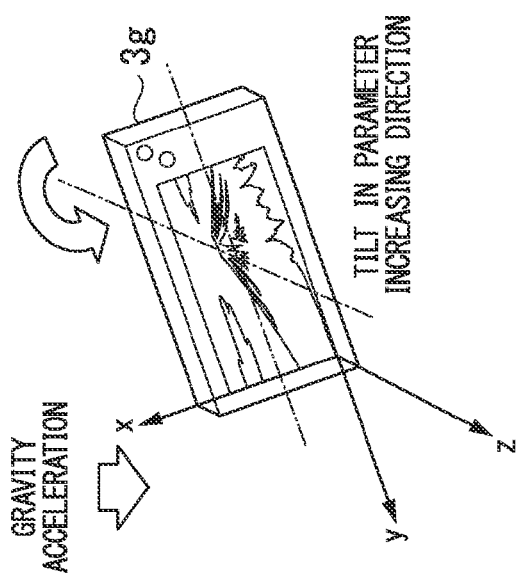
FIGS. 15A and 15B are diagrams each illustrating an example of processing of a determination section in the seventh embodiment.
Figure 15A:
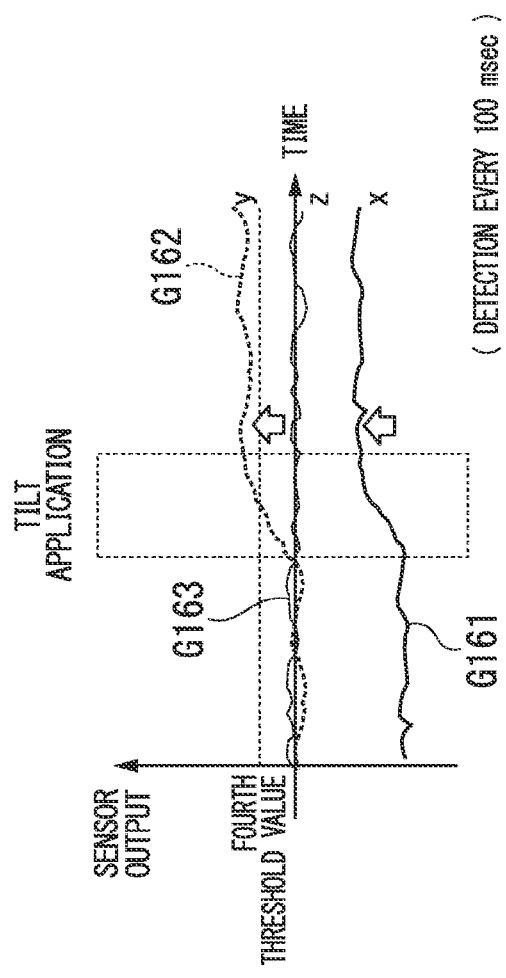

FIGS. 15A and 15B are diagrams each illustrating an example of processing of a determination section 321g in the seventh embodiment. FIGS. 15A and 15B are examples in which the determination section 321g determines that it is the imaging instruction when the difference between a reference value of the sensor output and the current sensor output of the motion detection section 31 is greater than or equal to a threshold value. In FIG. 15A, an example when a tilt is applied to the imaging instruction terminal 3g by tilting the imaging instruction terminal 3g to which the xyz coordinate system is allocated in the counterclockwise direction about the z axis based on a z-axis negative direction is illustrated. In this example, because the counterclockwise direction about the z axis based on the z-axis negative direction is a direction in which a parameter value increases, the imaging instruction terminal 3g is tilted in the direction in which the parameter value increases. In addition, an arrow representing a direction of gravity acceleration is illustrated.

In FIG. 15B, graphs of time variations of sensor outputs of the acceleration sensor before and after the above-described tilt application when the motion detection section 31 is a triaxial acceleration sensor are illustrated as an example. The graph of FIG. 15B is a polygonal line graph of the sensor output every 100 msec. A graph G161 is a graph representing time variation of the sensor output (hereinafter referred to as a sensor output x) of the acceleration sensor detecting the acceleration in the x-axis direction. As illustrated in the graph G161, the sensor output x gently increases with the passage of time while the tilt is applied. A graph G162 is a graph representing time variation of the sensor output (hereinafter referred to as a sensor output y) of the acceleration sensor detecting the acceleration in the y-axis direction. As illustrated in the graph G162, the sensor output y gently increases with the passage of time while the tilt is applied. A graph G163 is a graph representing time variation of a sensor output of the acceleration sensor detecting the acceleration in the z-axis direction.

In the examples of FIGS. 15A and 15B, the determination section 321g determines that it is the imaging parameter setting instruction, for example, when a difference between the sensor reference value and the current sensor output y is greater than or equal to a fourth threshold value using an average value of the sensor outputs y before the tilt application within a predetermined period as a reference value of the sensor output. In this case, because the current sensor output y is greater than the reference value and therefore the imaging instruction terminal 3g is considered to be tilted in the direction in which the parameter value increases, the determination section 321g determines to add an imaging parameter value. In this manner, the determination section 321g of the command generation section 32g determines the direction of an increase/decrease of the imaging parameter value according to a direction of motion detected by the motion detection section 31. Consequently, as an example, the determination section 321g increases the predetermined imaging parameter value from when the difference between the sensor reference value and the current sensor output y is greater than or equal to the fourth threshold value.

When the imaging parameter value is increased, the determination section 321g, for example, changes a speed of a change of the predetermined imaging parameter according to a variation amount of the sensor output y per unit time. Specifically, for example, the determination section 321g increases the speed of the change of the predetermined imaging parameter when the variation amount of the sensor output y per unit time increases. In this manner, the determination section 321g of the command generation section 32g determines the change speed of the imaging parameter according to a speed of the motion detected by the motion detection section 31.

Then, the determination section 321g, for example, stops the increase in the imaging parameter value when the difference between the sensor reference value and the current sensor output y is less than the fourth threshold value.

Also, the determination section 321g of the command generation section 32g may determine an image parameter setting amount according to a magnitude of the motion detected by the motion detection section 31. Specifically, for example, the determination section 321g may cause the imaging parameter setting amount to be largely changed when the magnitude of the motion increases.

When the variation of the sensor output greater than or equal to the predetermined threshold value has been detected within a predetermined time, the determination section 321g may determine that it is the imaging parameter setting instruction.

In addition, when the variation amount of the sensor output per unit time is greater than or equal to the predetermined threshold value, the determination section 321g may determine that it is the imaging parameter setting instruction.

Figure 16:
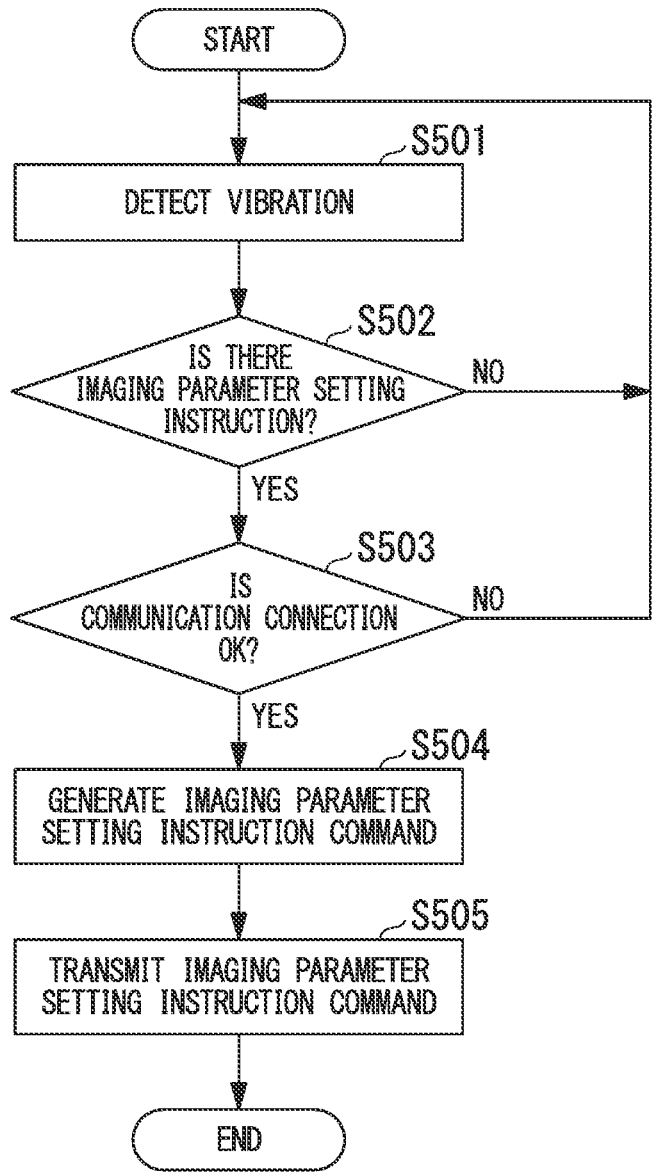
FIG. 16 is a flowchart illustrating an example of a processing flow of an imaging instruction terminal in the seventh embodiment.

FIG. 16 is a flowchart illustrating an example of a processing flow of the imaging instruction terminal in the seventh embodiment.

(Step S501) First, when the imaging instruction terminal 3g is moved and the imaging parameter setting instruction is given, the motion detection section 31 detects the motion of the imaging instruction terminal 3g and outputs a sensor output to the determination section 321g.

(Step S502) Next, the determination section 321g determines whether the input sensor output is an imaging parameter setting instruction. Upon determining that the input sensor output is the imaging parameter setting instruction (YES), the determination section 321g outputs imaging parameter setting information to the generation section 322g and proceeds to step S503. Upon determining that the input sensor output is not the imaging parameter setting instruction (NO), the determination section 321g returns to step S501.

(Step S503) Upon acquiring the imaging parameter setting information, the generation section 322a asks the communication control section 33 about a state of a communication connection with the imaging device 2, and acquires information representing the communication connection state. When communication is established (YES), the generation section 322g proceeds to step S504. On the other hand, when the communication is not established (NO), the generation section 322g returns to step S501.

(Step S504) Next, the generation section 322g generates an imaging parameter setting instruction command from the imaging parameter setting information input from the determination section 321g.

(Step S505) Next, the communication control section 33 causes the imaging parameter setting instruction command input from the generation section 322g to be transmitted from the communication module 34 to the imaging device 2. This ends the process of this flowchart. Thereby, the imaging device 2 can receive the imaging parameter setting instruction command and set the imaging parameter according to the imaging parameter setting instruction command.

Also, although the command generation section 32g checks the establishment of the communication, the present invention is not limited thereto. The establishment of the communication may not be checked.

When the difference between the sensor reference value and the current sensor output is greater than or equal to the fourth threshold value in the above seventh embodiment, the determination section 321g determines that it is the imaging parameter setting instruction as an example. Then, when the determination section 321g determines that it is the setting instruction, the generation section 322a generates the imaging parameter setting instruction command for issuing the imaging parameter setting instruction. Thereby, the user can change the imaging parameter setting of the imaging device 2 by merely titling the imaging instruction terminal 3g. Thus, it is possible to reduce an erroneous operation of the user because he or she can assign an imaging parameter setting-related instruction according to an intuitive operation of titling the imaging instruction terminal 3g without viewing the imaging instruction terminal 3g.

In addition, because it is only necessary for the user to tilt the imaging instruction terminal 3g, it is easy to operate the imaging instruction terminal 3g with one hand. Because the user can tilt the imaging instruction terminal 3g while firmly supporting opposing sides of the imaging instruction terminal 3g with five fingers even when the user operates the imaging instruction terminal 3g with one hand when the imaging instruction terminal 3g, for example, has a size capable of being held in one hand, it is possible to reduce the risk of dropping the imaging instruction terminal 3g.

(Eighth Embodiment)

Figure 17:
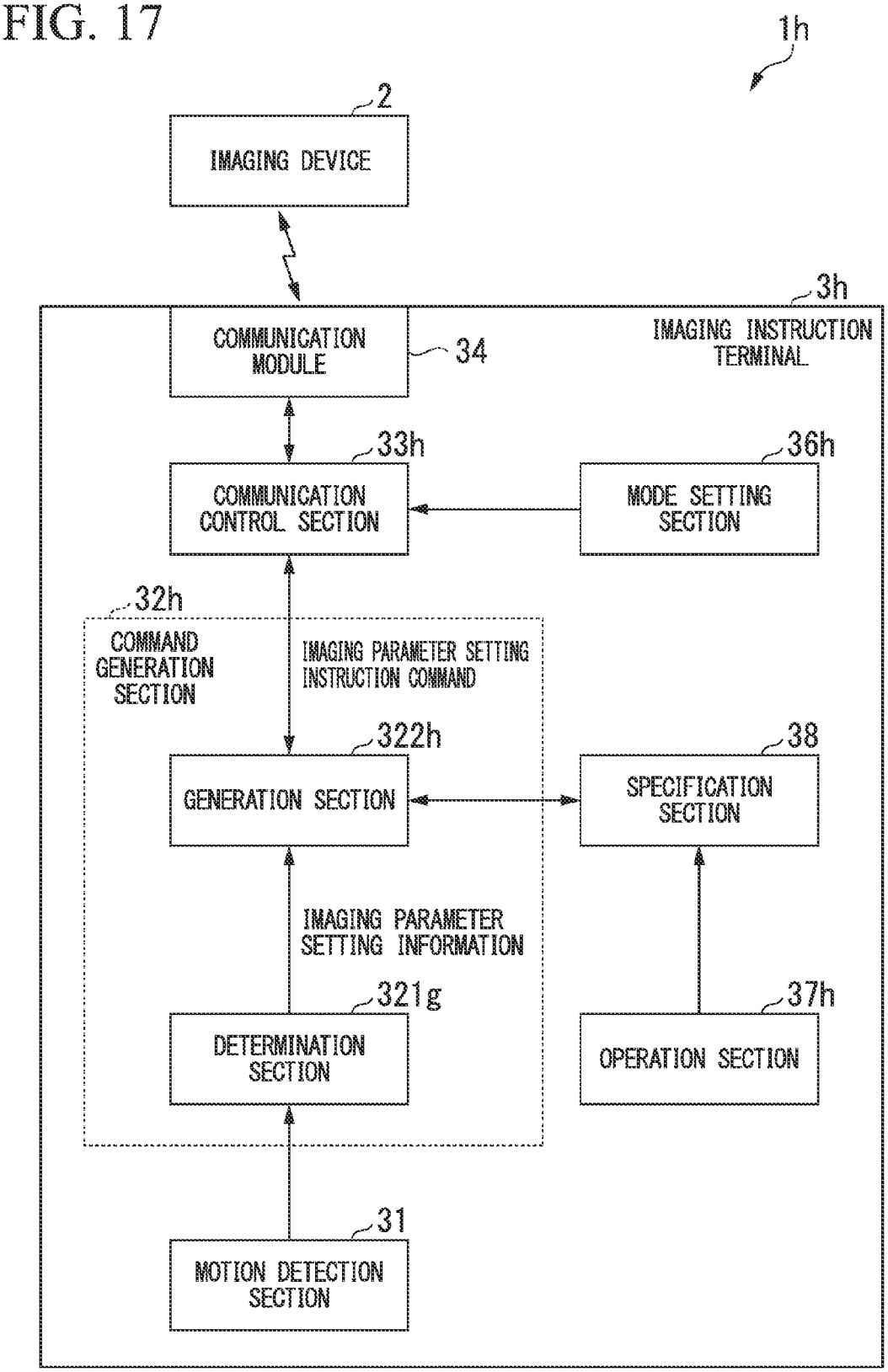
FIG. 17 is a schematic block diagram illustrating a configuration of an imaging system in an eighth embodiment.

Next, the eighth embodiment will be described. FIG. 17 is a schematic block diagram illustrating a configuration of an imaging system 1h in the eighth embodiment. The same reference signs are assigned to elements common with FIG. 14 and specific description thereof is omitted. The configuration of the imaging system 1h in the eighth embodiment is a configuration in which the imaging instruction terminal 3g is changed to an imaging instruction terminal 3h with respect to the configuration of the imaging system 1g in the seventh embodiment. The imaging instruction terminal 3h in the eighth embodiment is a configuration in which a mode setting section 36h, an operation section 37h, and a specification section 38 are added, the command generation section 32g is changed to a command generation section 32h, and the communication control section 33 is changed to a communication control section 33h with respect to the configuration of the imaging instruction terminal 3g in the seventh embodiment.

The mode setting section 36h sets an imaging parameter setting mode in which the instruction command related to the imaging parameter setting is transmitted to the imaging device 2 while the operation section 37h maintains the first operation state and sets a non-imaging parameter setting mode in which the instruction command related to the imaging parameter setting is not transmitted to the imaging device 2 while the operation section 37h maintains the second operation state. The mode setting section 36h, for example, holds mode information representing the set mode. For example, when the motion detection section 31 has detected motion less than the above-described threshold value and exceeding the second threshold value, the mode setting section 36h may switch the mode. Here, the second threshold value is less than the threshold value. Thereby, because the user can set the mode by assigning motion (for example, vibration) not exceeding the threshold value to the imaging instruction terminal 3c, convenience for the user is improved.

In addition, for example, when the operation section 37h is a touch panel, the mode setting section 36h may cause a mode switching button to be displayed on the touch panel. In this case, the mode setting section 36h may switch the mode when there is a tap at a position on the touch panel corresponding to the mode switching button and when the motion detection section 31 has detected motion less than the above-described threshold value and exceeding the second threshold value. Here, the tap is an operation of lightly tapping the touch panel with a finger once. Thereby, because the user can set the mode by tapping at a position on the touch panel corresponding to the mode switching button displayed on the imaging instruction terminal 3h, convenience for the user is improved.

In addition, for example, the mode setting section 36h may switch the mode according to the user's operation received by the operation section 37h. In this case, the mode setting section 36h may set the imaging parameter setting mode in which the instruction command related to the imaging parameter setting is transmitted to the imaging device while the operation section 37h maintains the first operation state and set the non-imaging parameter setting mode in which the instruction command related to the imaging parameter setting is not transmitted to the imaging device while the operation section 37h maintains the second operation state. For example, when the operation section 37h is the touch panel, the operation section 37h may detect whether the operation body (for example, the user's finger) is in contact with the touch panel (presence or absence of contact on the touch panel), maintain the first operation state when the operation body is in contact (when detecting presence of contact on the touch panel), and maintain the second operation state when the operation body is not in contact (when detecting absence of contact on the touch panel). The specification section 38 may set the mode to the imaging parameter setting mode while the operation section 37h detects that the contact is made and set the mode to the non-imaging parameter setting mode while the operation section 37c does not detect that the contact is made. Thereby, because the mode can be set according to the user's operation, convenience for the user is improved.

The communication control section 33h causes the imaging parameter setting instruction command generated by the command generation section 32g based on the motion detected by the motion detection section 31 to be transmitted from the communication module 34 to the imaging device 2 when the mode is the imaging parameter setting mode by referring to mode information held by the mode setting section 36h. On the other hand, when the mode is the non-imaging parameter setting mode, the communication control section 33h does not cause the imaging parameter setting instruction command to be transmitted from the communication module 34 to the imaging device 2.

The operation section 37h receives an operation in which the user selects a type of imaging parameter and outputs operation information representing the received operation to the specification section 38. The operation section 37h can switch the first operation state and the second operation state according to the received operation. Based on the operation received by the operation section 37h, the specification section 38 specifies the type of imaging parameter selected by the user and holds the specified type of imaging parameter.

The command generation section 32h is a configuration in which the generation section 322g is changed to a generation section 322h with respect to the configuration of the command generation section 32g in the seventh embodiment. Although the generation section 322h has a function similar to that of the generation section 322g in the seventh embodiment, the following point is different. The generation section 322h acquires the type of imaging parameter specified by the specification section 38 and generates the imaging parameter setting instruction command for issuing an instruction to set the acquired type of imaging parameter.

Figure 18:
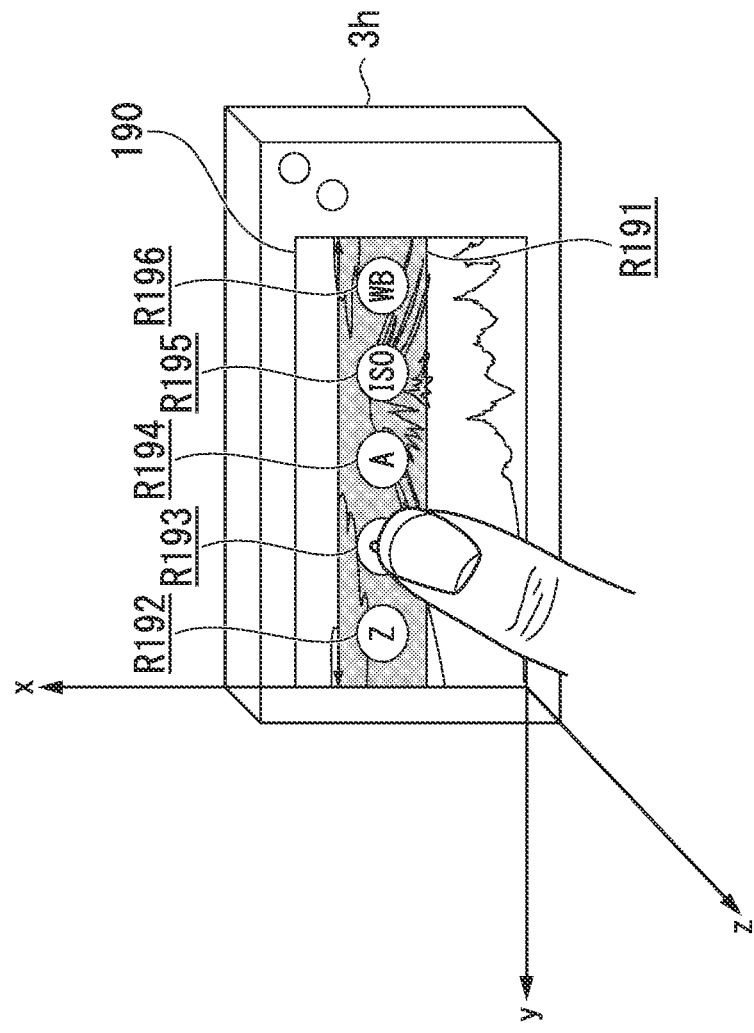
FIG. 18 is a diagram illustrating an example of processing of an operation section in the eighth embodiment.

FIG. 18 is a diagram illustrating an example of processing of the operation section 37h in the eighth embodiment. In the example of FIG. 18, the imaging instruction terminal 3h to which xyz coordinates are allocated includes a touch panel 190 as an example of the operation section 37h. In an image region R191 displayed on the touch panel 190, an image region R192 in which "Z" is encircled, an image region R193 in which "S" is encircled, an image region R194 in which "A" is encircled, an image region R195 in which "ISO" is encircled, and an image region R196 in which "WB" is encircled are displayed. Here, "Z" denotes zoom-in or zoom-out, "S" denotes a shutter speed, "A" denotes aperture, "ISO" denotes ISO sensitivity, and "WB" denotes white balance. In FIG. 18, an example in which a tip end of one finger (for example, a thumb) of the user is in contact with a position on the surface of the touch panel 190 corresponding to a position on an xy plane of the imaging region R193 is illustrated. In this example, the operation section 37h receives an operation of selecting the shutter speed and outputs operation information representing the received operation to the specification section 38. Thus, the specification section 38 specifies the shutter speed from the operation information, and holds information representing the specified shutter speed. In this case, the generation section 322h generates the imaging parameter setting instruction command for issuing a shutter speed setting instruction.

In addition, when the user moves the finger in a longitudinal direction of the touch panel 190 while the finger is in contact with the position on the xy plane of the image region R193 in the surface of the touch panel 190, the operation section 37, for example, senses the motion and the overall image region 193 moves according to the motion of the finger. Specifically, for example, the operation section 37h updates a display so that the overall image region R193 slides in a direction in which the finger moves so that the image region R193 is constantly displayed at the same xy coordinates as those of the finger in contact. Thereby, while the image region R193 is pressed, it is possible to move the image region R193 to a position at which it is easy to hold the imaging instruction terminal 3h.

Figure 19:
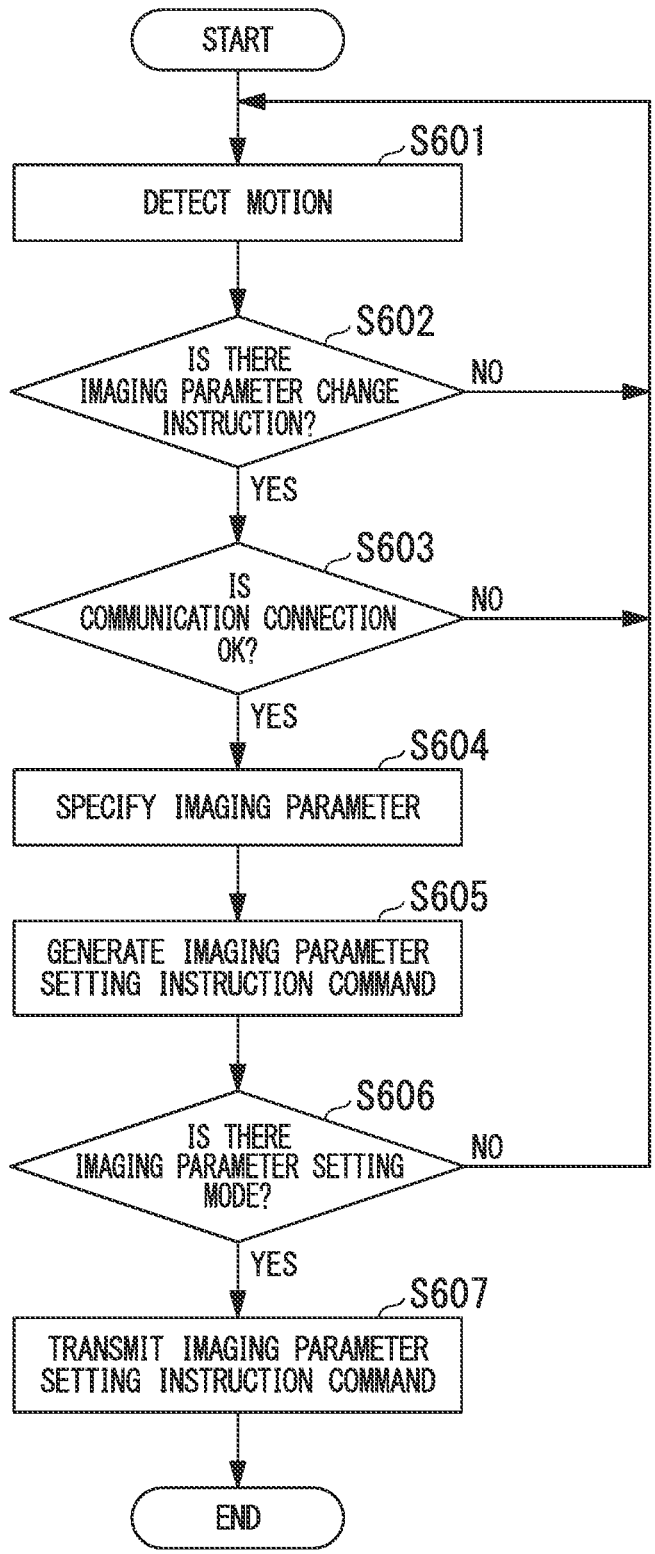
FIG. 19 is a flowchart illustrating an example of a processing flow of an imaging instruction terminal in the eighth embodiment.

FIG. 19 is a flowchart illustrating an example of a processing flow of the imaging instruction terminal 3h in the eighth embodiment. Because the processes of steps S601 to S603 are the same as the processes of steps S501 to S503 of FIG. 16, description thereof is omitted.

(Step S604) Next, the specification section 38 specifies a type of imaging parameter selected by the user based on the operation received by the operation section 37h.

(Step S605) Next, the generation section 322h acquires the type of imaging parameter specified by the specification section 38 and generates the imaging parameter setting instruction command for issuing an instruction to set the acquired type of imaging parameter. Here, the imaging parameter setting instruction command, for example, includes a parameter to be set and a parameter value. The generation section 322h outputs the generated imaging parameter setting instruction command to the communication control section 33h.

(Step S606) The communication control section 33h determines whether the mode is the imaging parameter setting mode by referring to the mode information held by the mode setting section 36h. When the mode is the imaging parameter setting mode (YES), the communication control section 33h proceeds to step S607. When the mode is not the imaging parameter setting mode (NO), the communication control section 33h returns to step S601.

(Step S607) Next, the communication control section 33h causes the imaging parameter setting instruction command generated by the generation section 322h to be transmitted from the communication module 34 to the imaging device 2. Thereby, because the imaging parameter setting instruction command, for example, includes a parameter to be set and its parameter value, the imaging device 2 can change the imaging parameter selected by the user to a value indicated by the imaging parameter setting instruction command. This ends the process of this flowchart.

Also, although the command generation section 32h checks the establishment of the communication, the present invention is not limited thereto. The establishment of the communication may not be checked.

In the imaging instruction terminal 3h of the above eighth embodiment, the operation section 37h receives an operation in which the user selects a type of imaging parameter. Then, based on the operation received by the operation section, the specification section 38 specifies the type of imaging parameter selected by the user. The generation section 322h generates the imaging parameter setting instruction command for issuing an instruction to set the type of imaging parameter specified by the specification section 38. Thereby, because the imaging device 2 changes the setting of the parameter for the type of imaging parameter selected by the user, there is an advantageous effect in that it is possible to reduce an erroneous operation when the imaging parameter is set in addition to the advantageous effect of the seventh embodiment.

Also, when the operation section 37h is a push button, the operation section 37h, for example, may maintain the first operation state when the push button is pressed once and maintain the second operation state different from the first operation state when the push button is pressed once more. In this case, the specification section 38 may set the mode to the imaging parameter setting mode while the operation section 37 maintains the first operation state and set the mode to the non-imaging parameter setting mode while the operation section 37 maintains the second operation state. Thereby, it is possible to set the mode every time the user presses the push button.

(Ninth Embodiment)

Figure 20:
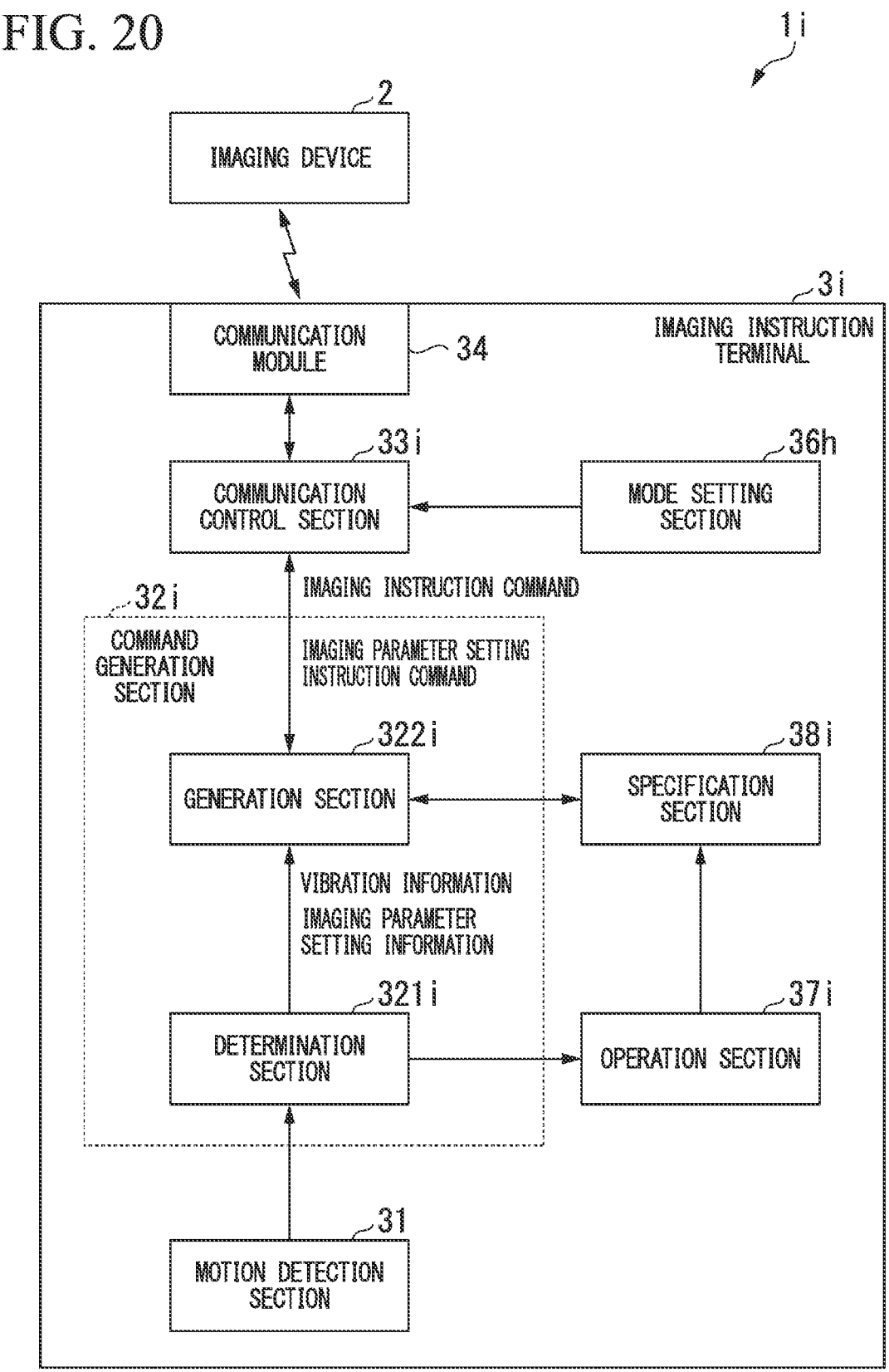
FIG. 20 is a schematic block diagram illustrating a configuration of an imaging system in a ninth embodiment.

Next, the ninth embodiment will be described. FIG. 20 is a schematic block diagram illustrating a configuration of an imaging system 1i in the ninth embodiment. Also, the same reference signs are assigned to elements common with FIG. 17 and specific description thereof is omitted. A configuration of the imaging system 1i in the ninth embodiment is a configuration in which the imaging instruction terminal 3h is changed to an imaging instruction terminal 3i with respect to the configuration of the imaging system 1h in the eighth embodiment. The imaging instruction terminal 3i in the ninth embodiment is a configuration in which the command generation section 32h is changed to a command generation section 32i, the communication control section 33h is changed to a communication control section 33i, the operation section 37h is changed to an operation section 37i, and the specification section 38 is changed to a specification section 38i with respect to the configuration of the imaging instruction terminal 3h of the eighth embodiment. The command generation section 32i includes a determination section 321i and a generation section 322i.

Like the determination section 321 of the second embodiment, the determination section 321i determines a sensor output variation amount related to time variation of the sensor output based on the obtained sensor output detected by the motion detection section 31, and determines that the motion detected by the motion detection section 31 is the imaging instruction for the imaging device 2 at a timing at which the determined sensor output variation mount has exceeded a predetermined threshold value.

In addition, like the determination section 321g of the eighth embodiment, the determination section 321i determines whether the motion detected by the motion detection section 31 is an imaging parameter setting instruction for the imaging device.

Like the generation section 322 of the second embodiment, the generation section 322i generates an imaging instruction command for issuing an imaging instruction to the imaging device 2 at a timing at which the determination section 321i determines that it is the imaging instruction. In addition, like the generation section 322 of the eighth embodiment, the generation section 322i generates an imaging parameter setting instruction command for issuing an imaging parameter setting instruction when the determination section 321i determines that it is the setting instruction.

When the imaging instruction command has been input from the generation section 322i, the communication control section 33i causes the input imaging instruction command to be transmitted from the communication module 34 to the imaging device 2. In addition, when the imaging parameter setting instruction command has been input from the generation section 322i, the communication control section 33i causes the input imaging parameter setting instruction command to be transmitted from the communication module 34 to the imaging device 2.

Figure 21:
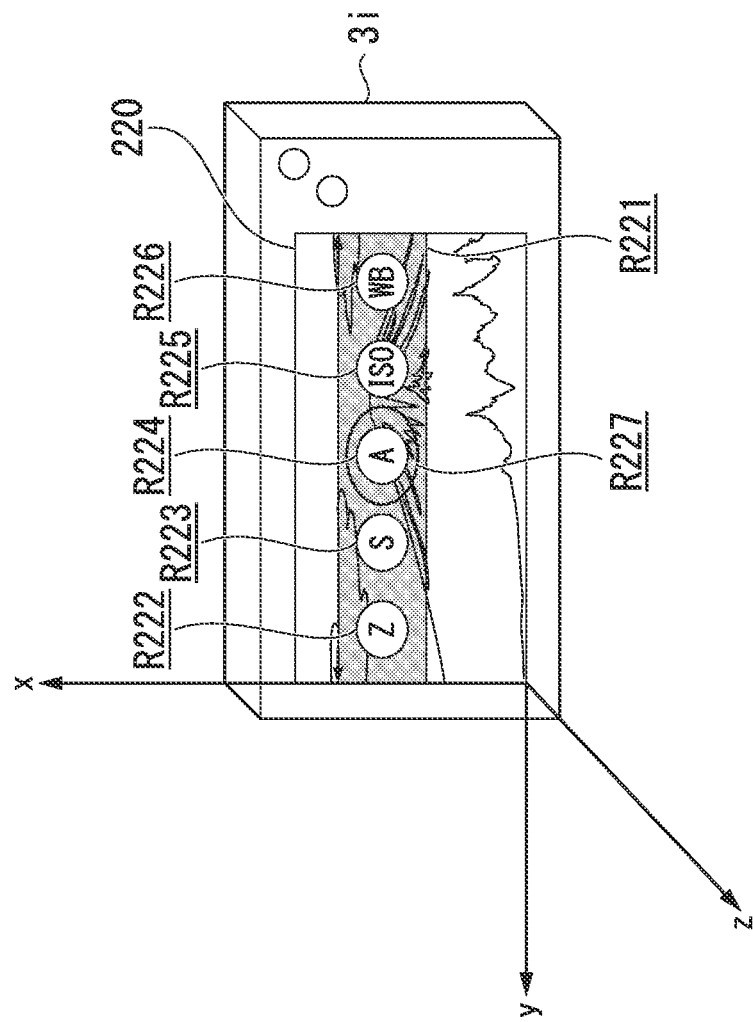
FIG. 21 is a diagram illustrating an example of processing of an operation section in the ninth embodiment.

Next, the processes of the operation section 37i and the specification section 38i will be described using FIG. 21. FIG. 21 is a diagram illustrating an example of processing of the operation section 37i in the ninth embodiment. In the example of FIG. 21, the imaging instruction terminal 3i to which xyz coordinates are allocated includes a touch panel 220 as an example of the operation section 37i. In an image region R221 displayed on the touch panel 220, an image region R222 in which "Z" is encircled, an image region R223 in which "S" is encircled, an image region R224 in which "A" is encircled, an image region R225 in which "ISO" is encircled, and an image region R226 in which "WB" is encircled are displayed. Here, "Z" denotes zoom-in or zoom-out, "S" denotes a shutter speed, "A" denotes aperture, "ISO" denotes ISO sensitivity, and "WB" denotes white balance.

In the example of FIG. 21, the case in which the imaging instruction terminal 3i has been tilted in a state in which the user has not touched the touch panel 220 with a finger is assumed. In this case, when the operation section 37i does not detect the contact of the user's finger and the determination section 321i, for example, detects that a difference between the sensor reference value and the current sensor output is greater than or equal to the fourth threshold value, the determination section 321i determines that it is a setting change parameter change instruction. Here, the sensor output reference value, for example, is an average value between sensor outputs within a predetermined period before the tilt application. Then, the determination section 321i switches a display of the touch panel 220 so that the image region R221 gradually slides in a direction in which the imaging instruction terminal 3i has been tilted. For example, when the imaging instruction terminal 3i has been tilted in a clockwise direction about the z axis based on a z-axis negative direction, the determination section 321i switches a display of the touch panel 220 so that the image region R221 gradually slides in a right direction toward a paper surface.

In FIG. 21, an image region R224 surrounded by the circle of "A" is surrounded by a frame R217. Next, the case in which the user has restored the imaging instruction terminal 3i from the titled state to the original state is assumed. In this case, when the operation section 37i does not detect the contact of the user's finger and the determination section 321i, for example, detects that the difference between the sensor reference value and the current sensor output is less than the fourth threshold value, the specification section 38i specifies the parameter (an aperture in the example of FIG. 21) corresponding to the image region (the image region R224 in the example of FIG. 21) surrounded by a frame R227 as a setting change parameter.

In the example of FIG. 21, the case in which the imaging instruction terminal 3i has been tilted in a state in which the user has touched an arbitrary position included in the surface of the touch panel 220 with the finger is assumed. In this case, when the operation section 37i detects the contact of the user's finger and the determination section 321i, for example, detects that the difference between the sensor reference value and the current sensor output is greater than or equal to the fourth threshold value, the determination section 321i determines that it is an instruction to change the selected parameter setting value. Then, the determination section 321i, for example, determines the parameter setting value in a direction of an increase/decrease of the imaging parameter value according to a positive/negative sign of a value obtained by subtracting the sensor reference value from the current sensor output. Thereby, the determination section 321i can determine the increase/decrease direction of the value of the imaging parameter according to a direction in which the imaging instruction terminal 3i has been tilted. In addition, the determination section 321i varies the parameter setting value at a speed according to the variation amount of the sensor output per unit time.

Subsequently, when the user separates the finger from the touch panel 220 and the operation section 37i does not detect the contact of the user's finger, the determination section 321i determines the parameter setting value by the parameter setting value at that time. Thereby, when the user separates the finger, the parameter setting value is determined.

Figure 22:
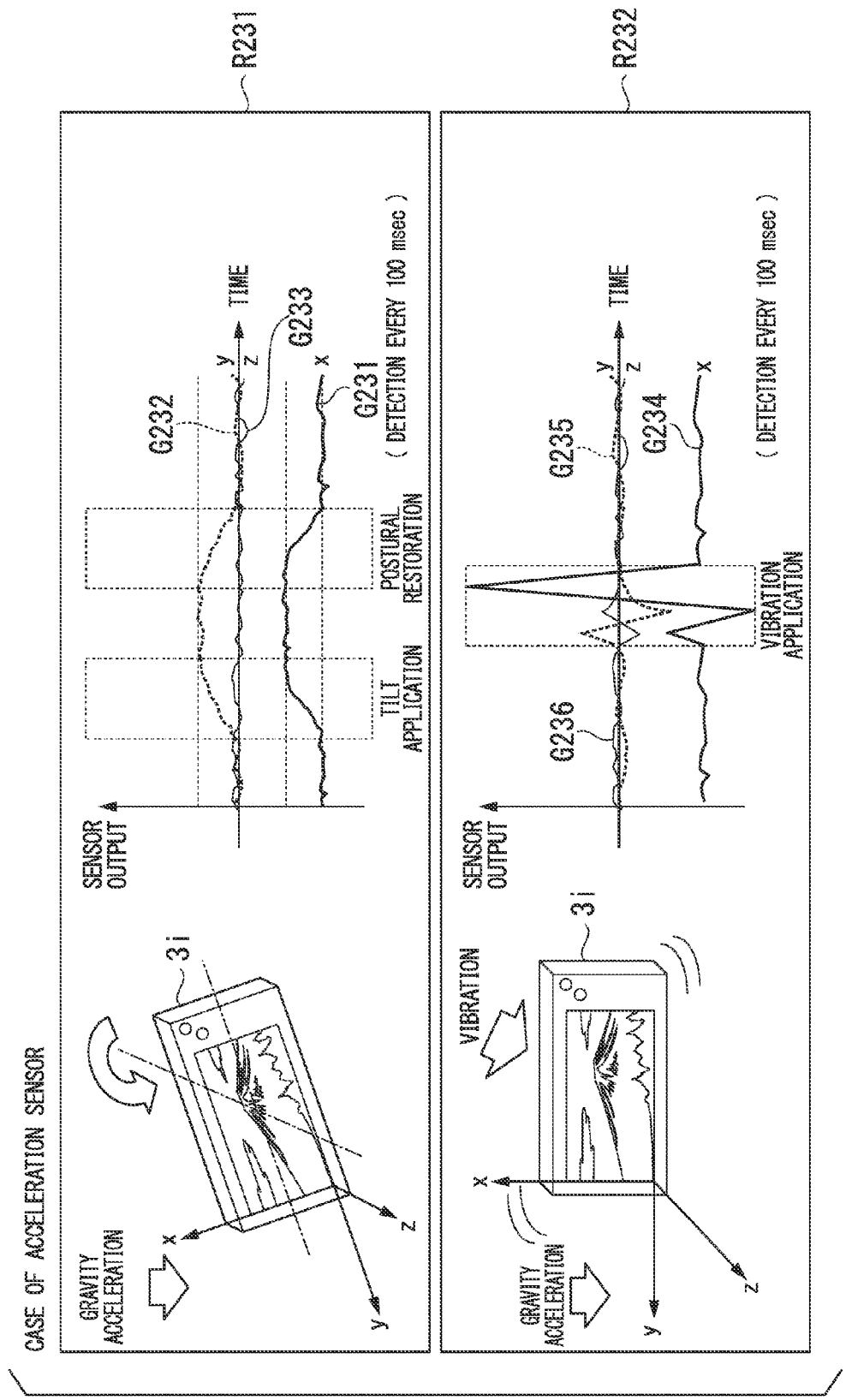
FIG. 22 is a diagram illustrating an example of processing of an imaging instruction terminal when a vibration detection sensor is an acceleration sensor.

FIG. 22 is a diagram illustrating an example of processing of the imaging instruction terminal 3i when the motion detection section 31 is a triaxial acceleration sensor. In a region R231 of FIG. 22, an example in which the imaging instruction terminal 3i to which the xyz coordinate system is allocated is tilted in the counterclockwise direction about the z axis based on the z-axis negative direction is illustrated. In this example, because the counterclockwise direction about the z axis based on the z-axis negative direction is a direction in which a parameter value increases, the imaging instruction terminal 3g is tilted in the direction in which the parameter value increases. In addition, an arrow representing a direction of gravity acceleration is illustrated.

On the right in the region R231 of FIG. 22, graphs of time variations of sensor outputs of the acceleration sensors before and after the above-described tilt application and before and after postural restoration are illustrated. The graph of FIG. 22 is a polygonal line graph of the sensor output every 100 msec. A graph G231 is a graph representing time variation of the sensor output of the acceleration sensor detecting the acceleration in the x-axis direction. A graph G232 is a graph representing time variation of a sensor output of the acceleration sensor detecting the acceleration in the y-axis direction. A graph G233 is a graph representing time variation of a sensor output of the acceleration sensor detecting the acceleration in the z-axis direction.

In a region R232 of FIG. 22, an example in which the imaging instruction terminal 3i to which the xyz coordinate system is allocated is tilted in the x-axis positive direction is illustrated.

On the right in the region R232 of FIG. 22, graphs of time variations of sensor outputs of the acceleration sensor before and after the above-described vibration application are illustrated. The graph of FIG. 22 is a polygonal line graph of the sensor output every 100 msec. A graph G234 is a graph representing time variation of the sensor output of the acceleration sensor detecting the acceleration in the x-axis direction. A graph 6235 is a graph representing time variation of a sensor output of the acceleration sensor detecting the acceleration in the y-axis direction. A graph G236 is a graph representing time variation of a sensor output of the acceleration sensor detecting the acceleration in the z-axis direction.

In the example of FIG. 22, the user tilts the imaging instruction terminal 3i without causing the finger to be in contact with the touch panel 220, and therefore the determination section 321i switches a screen of the touch panel 220 so that the image region R221 of FIG. 21 is caused to slide. When the parameter desired to be set is in a central frame (see FIG. 21) displayed on the touch panel 220 (see FIG. 21), the user restores the posture of the imaging instruction terminal 3i to the original. Thereby, the specification section 38i specifies the parameter corresponding to the image region displayed on the central frame. Thereby, the user can select the parameter desired to be set. After the parameter desired to be set has been selected, the user, for example, changes the selected parameter value by tilting the imaging instruction terminal 3i about the y axis. At this time, for example, if the acceleration in the z-axis direction is out of a predetermined range, the determination section 321i starts to change the parameter value in a direction in which the parameter value increases as an example when the acceleration in the z-axis direction is negative and starts to change the parameter value in a direction in which the parameter value decreases as an example when the acceleration in the z-axis direction is positive. Then, when the acceleration in the z-axis direction is in the predetermined range, the determination section 321i stops a change in the parameter value. Thereby, the user can change a value of a selected parameter.

Next, when the user vibrates the imaging instruction terminal 3i in the x-axis positive direction once, the determination section 321i, for example, determines a sensor output variation amount related to a time variation of the sensor output of the acceleration sensor and determines that the vibration detected by the acceleration sensor is an imaging instruction for the imaging device 2 at a timing at which the determined sensor output variation amount has exceeded a predetermined threshold value. At a timing at which the determination section 321i determines that the vibration is the imaging instruction, the generation section 322i generates an imaging instruction command for issuing an imaging instruction to the imaging device 2. When the generation section 322i has generated the imaging instruction command, the communication control section 33 causes the imaging instruction command to be transmitted from the communication module 34 to the imaging device 2. Upon receiving the imaging instruction command, the imaging device 2 starts imaging. In this manner, the user can cause the imaging device 2 to perform imaging by vibrating the imaging instruction terminal 3*i* once.

FIG. 23 is a diagram illustrating an example of processing of the imaging instruction terminal 3*i* when the vibration detection sensor 311 includes a triaxial acceleration sensor and a triaxial gyro sensor. In a region R241 of FIG. 23, an example in which the imaging instruction terminal 3*i* to which the xyz coordinate system is allocated is tilted in the counterclockwise direction about the z axis based on a z-axis negative direction is illustrated. In this example, because the counterclockwise direction about the z axis based on the z-axis negative direction is a direction in which a parameter value increases, the imaging instruction terminal 3*g* is tilted in the direction in which the parameter value increases. In addition, an arrow representing a direction of gravity acceleration is illustrated.

On the right in the region R241 of FIG. 23, graphs of time variations of sensor outputs of the gyro sensor before and after the above-described tilt application are illustrated. The graph of FIG. 23 is a polygonal line graph of the sensor output every 100 msec. A graph G241 is a graph representing time variation of the sensor output of the gyro sensor detecting the angular velocity about the x axis. A graph G242 is a graph representing time variation of the sensor output of the gyro sensor detecting the angular velocity about the y axis. A graph G243 is a graph representing time variation of the sensor output of the gyro sensor detecting the angular velocity about the z axis.

In the example of FIG. 23, the user tilts the imaging instruction terminal 3*i* without causing the finger to be in contact with the touch panel 220 and therefore the determination section 321*i* switches a screen of the touch panel 220 so that the image region R221 of FIG. 21 is caused to slide. When the parameter desired to be set is in a central frame 8227 (see FIG. 21) displayed on the touch panel 220 (see FIG. 21), the user restores the posture of the imaging instruction terminal 3*i* to the original. Thereby, the specification section 38*i* specifies the parameter corresponding to the image region displayed on the central frame. Thereby, the user can select the parameter desired to be set. After the parameter desired to be set has been selected, the user, for example, changes the selected parameter value by tilting the imaging instruction terminal 3*i* about the y axis. At this time, for example, if the angular velocity about the y axis is out of a predetermined range, the determination section 321*i* starts to change the parameter value in a direction in which the parameter value increases as an example when the angular velocity about the y axis is positive and starts to change the parameter value in a direction in which the parameter value decreases as an example when the angular velocity about the y axis is negative. Then, when the angular velocity about the y axis is in the predetermined range, the determination section 321*i* stops a change in the parameter value. Thereby, the user can change a value of a selected parameter.

Next, when the user vibrates the imaging instruction terminal 3*i* in the x-axis positive direction once, the determination section 321*i*, for example, determines a sensor output variation amount related to time variation of the sensor output of the acceleration sensor and determines that the vibration detected by the acceleration sensor is an imaging instruction for the imaging device 2 at a timing at which the determined sensor output variation amount has exceeded a predetermined threshold value. At a timing at which the determination section 321*i* determines that the vibration is the imaging instruction, the generation section 322*i* generates an imaging instruction command for issuing an imaging instruction to the imaging device 2. When the generation section 322*i* has generated the imaging instruction command, the communication control section 33 causes the imaging instruction command to be transmitted from the communication module 34 to the imaging device 2. Upon receiving the imaging instruction command, the imaging device 2 starts imaging. In this manner, the user can cause the imaging device 2 to perform imaging by vibrating the imaging instruction terminal 3*i* once.

Also, the imaging instruction terminal 3*i* may operate according to conditions illustrated in FIG. 24. FIG. 24 is a table showing a set of a condition of an output variation of each sensor provided in the imaging instruction terminal 3*i* and an operation of the imaging instruction terminal 3*i*. In FIG. 24, sets of an identification number for identifying an operation condition, a condition of an output of the acceleration sensor, a condition of an output of the gyro sensor, a condition of an output of the terrestrial magnetism sensor, and remarks for describing these conditions and the operations are illustrated.

In an example of No. 1 of FIG. 24, the acceleration is assumed to be rapidly varied when the motion detection section 31 is an acceleration sensor. When the acceleration sensor has detected the output variation greater than or equal to a threshold value within predetermined A (for example, 0.5) sec on one or more axes, the command generation section 32*i*, for example, may determine that the instruction is a single shooting instruction.

In an example of No. 2 of FIG. 24, the acceleration is assumed to be rapidly varied when the motion detection section 31 is the acceleration sensor. When the acceleration sensor has detected the output variation amount (corresponding to a tilt) per unit time greater than or equal to a predetermined value on one or more axes, the command generation section 32*i*, for example, may determine that the instruction is the single shooting instruction.

In an example of No. 3 of FIG. 24, the acceleration is assumed to be rapidly varied when the motion detection section 31 is the acceleration sensor. When the acceleration sensor has continuously detected the output variation greater than or equal to a threshold value within predetermined A (for example, 0.5) sec on one or more axes N or more times (N is a positive integer, for example, 2), the command generation section 32*i*, for example, may determine that it is a continuous shooting instruction.

In an example of No. 4 of FIG. 24, the acceleration is assumed to be rapidly varied when the motion detection section 31 is the acceleration sensor. When the acceleration sensor has continuously detected the output variation amount (corresponding to a tilt) per unit time greater than or equal to a predetermined value on one or more axes N or more times (N is a positive integer, for example, 2), the command generation section 32*i*, for example, may determine that it is the continuous shooting instruction.

In an example of No. 5 of FIG. 24, the acceleration is assumed to be slowly varied when the motion detection section 31 is the acceleration sensor. When the acceleration sensor has detected the output variation greater than or equal to the fourth threshold value for a time exceeding predetermined A (for example, 0.5) sec on one or more axes, the command generation section 32*i*, for example, may determine that the instruction is an instruction to move a parameter candidate to be selected. In this case, the command generation section 32*i* may determine a movement direction by the sign of a sensor output of the acceleration sensor and change a speed of movement of a parameter candidate according to a magnitude of an absolute value of the sensor output of the acceleration sensor.

In an example of No. 6 of FIG. 24, the acceleration is assumed to be slowly varied when the motion detection section 31 is the acceleration sensor. When the acceleration sensor has detected the output variation amount per unit time less than or equal to a predetermined value on one or more axes, the command generation section 32*i*, for example, may determine that it is an instruction to move a parameter candidate to be selected. In this case, the command generation section 32*i* may determine a movement direction by the sign of a sensor output of the acceleration sensor and change a speed of movement of an imaging parameter candidate according to a magnitude of an absolute value of the sensor output of the acceleration sensor.

In an example of No. 7 of FIG. 24, the command generation section 32*i* generates an imaging instruction command by prioritizing imaging and stopping the movement of an imaging parameter candidate when the variation of the sensor output of the acceleration sensor is a combination of any one of Nos. 1 to 4 and any one of Nos. 5 and 6. In this case, the imaging device 2 performs imaging by imaging parameters set up to an immediately previous time.

In an example of No. 8 of FIG. 24, the command generation section 32*i*, for example, may determine that it is an instruction to move a parameter candidate to be selected as in No. 5 when the motion detection section 31 is the gyro sensor and the gyro sensor has detected the output variation greater than or equal to a threshold value on one or more axes for a time exceeding predetermined A sec. In this case, the command generation section 32*i* may determine a movement direction by the sign of a sensor output of the gyro sensor and change a speed of movement of an imaging parameter candidate according to a magnitude of an absolute value of the sensor output of the gyro sensor.

In an example of No. 9 of FIG. 24, the command generation section 32*i*, for example, may determine that it is an instruction to move a parameter candidate to be selected as in No. 5 when the motion detection section 31 is the gyro sensor and the gyro sensor has detected the output variation amount per unit time less than or equal to a predetermined value on one or more axes. In this case, the command generation section 32*i* may determine a movement direction by the sign of a sensor output of the gyro sensor and change a speed of movement of a parameter candidate according to a magnitude of an absolute value of the sensor output of the gyro sensor.

In an example of No. 10 of FIG. 24, the sensor output is assumed to be rapidly varied when the motion detection section 31 is the terrestrial magnetism sensor. When the terrestrial magnetism sensor has detected the output variation greater than or equal to a threshold value for a time exceeding predetermined A (for example, 0.5) sec on one or more axes, the command generation section 32*i*, for example, may determine that it is an instruction to move a parameter candidate to be selected as in No. 5. In this case, the command generation section 32*i* may determine a movement direction by the sign of a sensor output of the terrestrial magnetism sensor and change a speed of movement of a parameter candidate according to a magnitude of an absolute value of the sensor output of the terrestrial magnetism sensor.

In an example of No. 11 of FIG. 24, the sensor output is assumed to be rapidly varied when the motion detection section 31 is the terrestrial magnetism sensor. When the terrestrial magnetism sensor has detected the output variation amount per unit time less than or equal to a predetermined value on one or more axes, the command generation section 32*i*, for example, may determine that it is an instruction to move a parameter candidate to be selected as in No. 5. In this case, the command generation section 32*i* may determine a movement direction by the sign of a sensor output of the terrestrial magnetism sensor and change a speed of movement of a parameter candidate according to a magnitude of an absolute value of the sensor output of the terrestrial magnetism sensor.

In an example of No. 12 of FIG. 24, the command generation section 32*i* generates an imaging instruction command by prioritizing imaging and stopping the movement of an imaging parameter candidate as in No. 7 when the motion detection section 31 includes the acceleration sensor and the gyro sensor, the variation of the sensor output of the acceleration sensor corresponds to a combination of any one of Nos. 1 to 4 and either of Nos. 5 and 6, and the variation of the sensor output of the gyro sensor corresponds to either of Nos. 8 and 9. In this case, the imaging device 2 performs imaging by imaging parameters set up to an immediately previous time. In addition, the selection of the imaging parameter candidate is the case in which the sensor output of the acceleration sensor is preferentially changed and the case in which the sensor output of the gyro sensor is preferentially changed.

In an example of No. 13 of FIG. 24, the command generation section 32*i* generates an imaging instruction command by prioritizing imaging and stopping the movement of an imaging parameter candidate as in No. 7 when the motion detection section 31 includes the acceleration sensor and the terrestrial magnetism sensor, the variation of the sensor output of the acceleration sensor corresponds to a combination of any one of Nos. 1 to 4 and either of Nos. 5 and 6, and the variation of the sensor output of the terrestrial magnetism sensor corresponds to either of Nos. 10 and 11. In this case, the imaging device 2 performs imaging by imaging parameters set up to an immediately previous time. In addition, the selection of the imaging parameter candidate is the case in which the sensor output of the acceleration sensor is preferentially changed and the case in which the sensor output of the terrestrial magnetism sensor is preferentially changed.

In an example of No. 14 of FIG. 24, the command generation section 32*i* generates an imaging instruction command by prioritizing imaging and stopping the movement of an imaging parameter candidate as in No. 7 when the motion detection section 31 includes the acceleration sensor, the gyro sensor, and the terrestrial magnetism sensor, the variation of the sensor output of the acceleration sensor corresponds to a combination of any one of Nos. 1 to 4 and either of Nos. 5 and 6, the variation of the sensor output of the gyro sensor corresponds to either of Nos. 8 and 9, and the variation of the sensor output of the terrestrial magnetism sensor corresponds to either of Nos. 10 and 11. In this case, the imaging device 2 performs imaging by imaging parameters set up to an immediately previous time. In addition, the selection of the imaging parameter candidate is the case in which the sensor output of the acceleration sensor is preferentially changed, the case in which the sensor output of the gyro sensor is preferentially changed, and the case in which the sensor output of the terrestrial magnetism sensor is preferentially changed.

Also, different types of imaging parameters may be allocated to a plurality of axes allocated to an own terminal. According to motion detected by the motion detection section 31, the command generation section 32*i* may determine an axis about which its own terminal has rotated among the plurality of axes and generate an imaging parameter setting instruction command for issuing an imaging parameter setting instruction corresponding to the determined axis.

Figure 25A:
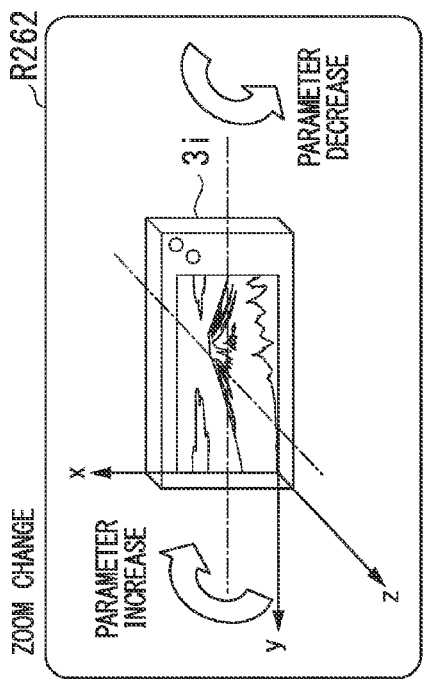
FIGS. 25A to 25C are examples in which a different type of imaging parameter is allocated to each axis allocated to the imaging instruction terminal.
Figure 25B:
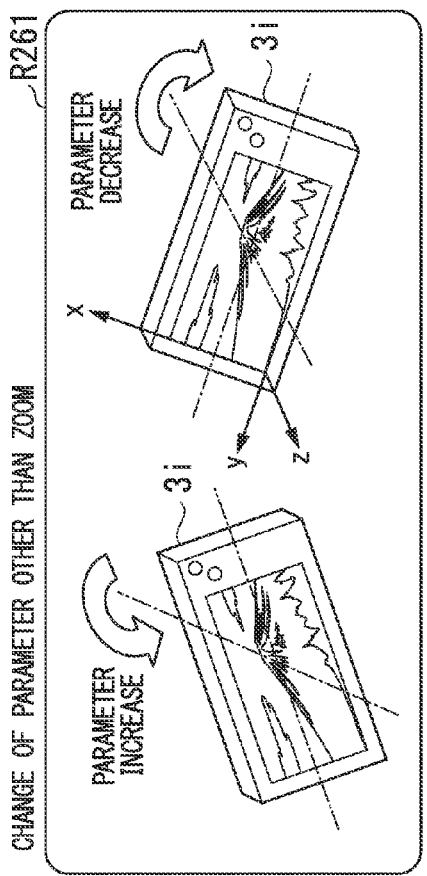
Figure 25C:
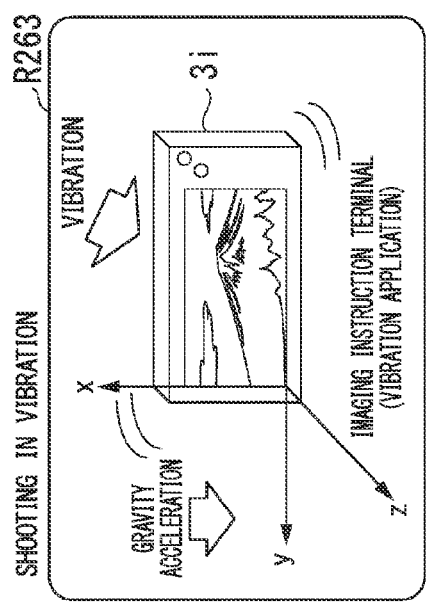

FIGS. 25A to 25C are examples in which a different type of imaging parameter is allocated to each axis allocated to the imaging instruction terminal 3i. In R261 of FIG. 25A, an example in which a value of a parameter (for example, a shutter speed, aperture, ISO sensitivity, white balance, or the like) other than zoom increases/decreases by forming a tilt about the z axis is illustrated. In R262 of FIG. 25B, an example in which the zoom value increases/decreases by forming a tilt about the y axis is illustrated. In R263 of FIG. 25C, an example in which the imaging instruction terminal 3i is vibrated in the x-axis negative direction to generate an imaging instruction command and the imaging device 2 is caused to perform imaging is illustrated.

Also, this is not limited to the vibration detection sensor 311. In the seventh embodiment of FIG. 14, the command generation section 32g may determine an axis about which its own terminal has rotated among the plurality of axes according to motion detected by the motion detection section 31, and generate an imaging parameter setting instruction command for issuing an imaging parameter setting instruction corresponding to the determined axis.

Also, various processes described above related to the imaging instruction terminal may be performed by recording a program for executing each process of the imaging instruction terminal of each embodiment on a computer-readable recording medium and causing a computer system to read and execute the program recorded on the recording medium.

Also, the "computer system" used here may include an operating system (OS) and hardware such as peripheral devices. In addition, the computer system may include a homepage providing environment (or displaying environment) when a World Wide Web (WWW) system is used. The "computer-readable recording medium" refers to a storage device, including a flexible disk, a magneto-optical disc, a read only memory (ROM), a writable nonvolatile memory such as a flash memory, a portable medium such as a compact disc (CD)-ROM, and a hard disk embedded in the computer system.

Furthermore, the "computer-readable recording medium" is assumed to be a medium that holds a program for a constant period of time, such as a volatile memory (e.g., dynamic random access memory (DRAM)) inside a computer system serving as a server or a client when the program is transmitted via a network such as the Internet or a communication line such as a telephone line. In addition, the above-described program may be transmitted from a computer system storing the program in a storage device or the like via a transmission medium or transmitted to another computer system by transmission waves in a transmission medium. Here, the "transmission medium" refers to a medium having a function of transmitting information, such as a network (communication network) like the Internet or a communication circuit (communication line) like a telephone line. In addition, the above-described program may be a program for implementing some of the above-described functions. Further, the above-described program may be a program, i.e., a so-called differential file (differential program), capable of implementing the above-described functions in combination with a program already recorded on the computer system.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An imaging instruction terminal comprising:
  a communication module configured to communicate with an imaging device, wherein the imaging device is separate from the imaging instruction terminal;
  a motion detection section configured to detect motion information about motion of the imaging instruction terminal;
  a command generation section configured to generate an instruction command related to imaging for the imaging device at a timing at which the motion information detected by the motion detection section has exceeded a predetermined threshold value; and
  a communication control section configured to cause the instruction command related to the imaging to be transmitted from the communication module to the imaging device when the command generation section has generated the instruction command related to the imaging.

2. The imaging instruction terminal according to claim 1, wherein
  the motion detection section is a vibration detection sensor configured to detect information about vibration of the imaging instruction terminal, and
  the command generation section includes:
  a determination section configured to determine that the vibration detected by the vibration detection sensor is an imaging instruction for the imaging device at the timing at which the vibration information detected by the vibration detection section has exceeded a predetermined threshold value; and
  a generation section configured to generate an imaging instruction command for issuing the imaging instruction for the imaging device to perform the imaging at the timing at which the determination section determines that the vibration is the imaging instruction.

3. The imaging instruction terminal according to claim 2, further comprising:
  a mode setting section configured to set an imaging mode in which the instruction command related to the imaging is transmitted to the imaging device and a non-imaging mode in which the instruction command related to the imaging is not transmitted to the imaging device,
  wherein the communication control section causes the imaging instruction command generated by the command generation section during the imaging mode to be transmitted from the communication module to the imaging device.

4. The imaging instruction terminal according to claim 3, further comprising:
  an operation section configured to receive an operation in which a user selects the imaging mode or the non-imaging mode,
  wherein the mode setting section sets the mode to the imaging mode or the non-imaging mode based on the operation received by the operation section.

5. The imaging instruction terminal according to claim 4, wherein
  the operation section is able to set a first operation state and a second operation state according to the received operation, and
  the mode setting section sets the mode to the imaging mode while the operation section maintains the first operation state and sets the mode to the non-imaging mode while the operation section maintains the second operation state.

6. The imaging instruction terminal according to claim 5, wherein the operation section detects presence or absence of contact on a touch panel, maintains the first operation state when detecting presence of contact on the touch panel, and maintains the second operation state when detecting absence of contact on the touch panel.

7. The imaging instruction terminal according to claim 3, wherein the mode setting section causes power to be supplied to the vibration detection sensor during the imaging mode and causes the power to be prevented from being supplied to the vibration detection sensor during the non-imaging mode.

8. The imaging instruction terminal according to claim 2, wherein
the determination section determines whether the vibration detected by the vibration detection sensor is a continuous shooting instruction for the imaging device based on a variation amount of a sensor output detected and obtained by the vibration detection sensor, and
the generation section generates the imaging instruction command for continuously instructing the imaging device to perform continuous shooting when the determination section determines the continuous shooting instruction.

9. The imaging instruction terminal according to claim 2, wherein the imaging instruction for the imaging device to perform the imaging is a shutter release instruction.

10. The imaging instruction terminal according to claim 1, wherein the communication module is configured to communicate with an imaging device wirelessly.

11. The imaging instruction terminal according to claim 1, wherein
the instruction command related to the imaging is an imaging parameter setting instruction command for issuing an instruction to set an imaging parameter, and
the command generation section includes:
a determination section configured to determine whether the motion information is an imaging parameter setting instruction for the imaging device at the timing at which the motion information detected by the motion detection section has exceeded the predetermined threshold value; and
a generation section configured to generate the imaging parameter setting instruction command when the determination section determines the setting instruction.

12. The imaging instruction terminal according to claim 11, further comprising:
a mode setting section configured to set an imaging parameter setting mode in which the instruction command related to the imaging parameter setting is transmitted to the imaging device and a non-imaging parameter setting mode in which the instruction command related to the imaging parameter setting is not transmitted to the imaging device,
wherein the communication control section causes the imaging parameter setting instruction command generated by the command generation section to be transmitted from the communication module to the imaging device during the imaging parameter setting mode.

13. The imaging instruction terminal according to claim 11, wherein the command generation section determines a setting amount of an imaging parameter according to a magnitude of motion detected by the motion detection section.

14. The imaging instruction terminal according to claim 11, wherein the command generation section determines a change speed of an imaging parameter according to a speed of motion detected by the motion detection section.

15. The imaging instruction terminal according to claim 11, wherein the command generation section determines a direction of an increase/decrease of a value of an imaging parameter according to the direction of motion detected by the motion detection section.

16. The imaging instruction terminal according to claim 11, wherein
a different type of imaging parameter is allocated to each of a plurality of axes allocated to the imaging instruction terminal, and
the command generation section determines an axis about which the imaging instruction terminal rotates according to motion detected by the motion detection section among the plurality of axes and generates an imaging parameter setting instruction command for issuing an instruction to set an imaging parameter corresponding to the determined axis.

17. The imaging instruction terminal according to claim 11, further comprising:
an operation section configured to receive an operation in which a user selects a type of imaging parameter; and
a specification section configured to specify the type of imaging parameter selected by the user based on the operation received by the operation section,
wherein the generation section generates an imaging parameter setting instruction command for issuing an instruction to set the type of imaging parameter specified by the specification section.

18. The imaging instruction terminal according to claim 17, wherein
the operation section is able to switch a first operation state and a second operation state according to the received operation, and
the imaging instruction terminal includes a mode setting section configured to set the mode to an imaging parameter setting mode in which the instruction command related to the imaging parameter setting is transmitted to the imaging device while the operation section maintains the first operation state and set the mode to a non-imaging parameter setting mode in which the instruction command related to the imaging parameter setting is not transmitted to the imaging device while the operation section maintains the second operation state.

19. An imaging system including an imaging device and an imaging instruction terminal configured to issue an instruction related to imaging to an imaging device,
wherein the imaging instruction terminal includes:
a communication module configured to communicate with the imaging device, wherein the imaging device is separate from the imaging instruction terminal;
a motion detection section configured to detect motion information about motion of the imaging instruction terminal;
a command generation section configured to generate an instruction command related to the imaging for the imaging device at a timing at which the motion information detected by the motion detection section has exceeded a predetermined threshold value; and
a communication control section configured to cause the instruction command related to the imaging to be transmitted from the communication module to the imaging device when the command generation section has generated the instruction command related to the imaging.

20. An imaging instruction method which is executed by an imaging instruction terminal including a communication module configured to communicate with an imaging device, wherein the imaging device is separate from the imaging instruction terminal, the imaging instruction method comprising:
- detecting, by a motion detection section of the imaging instruction terminal, motion information about motion of the imaging instruction terminal;
- generating, by a command generation section of the imaging instruction terminal, an instruction command related to the imaging for the imaging device at a timing at which the motion information detected by the motion detection section has exceeded a predetermined threshold value; and
- causing, by a communication control section of the imaging instruction terminal, the instruction command related to the imaging to be transmitted from the communication module to the imaging device when the command generation section has generated the instruction command related to the imaging.

21. A non-transitory computer-readable storage device saving a computer program for causing an imaging instruction terminal, which includes a communication module configured to communicate with an imaging device which is separate from the imaging instruction terminal and a motion detection section configured to detect motion information about motion of the imaging instruction terminal, to execute:
- a command generation step of generating an instruction command related to the imaging for the imaging device at a timing at which the motion information detected by the motion detection section has exceeded a predetermined threshold value; and
- a communication control step of causing the instruction command related to the imaging to be transmitted from the communication module to the imaging device when the instruction command related to the imaging has been generated in the command generation step.

* * * * *